US011883352B2

(12) United States Patent
Giacometti et al.

(10) Patent No.: US 11,883,352 B2
(45) Date of Patent: *Jan. 30, 2024

(54) WEARABLE SENSOR DEVICES AND SYSTEMS FOR PATIENT CARE

(71) Applicant: ZOLL Medical Corporation, Chelmsford, MA (US)

(72) Inventors: Paolo Giacometti, North Grafton, MA (US); Annemarie Silver, Bedford, MA (US); Lisa Campana, Waltham, MA (US); Frederick J. Geheb, Lenexa, KS (US); Gary A. Freeman, Waltham, MA (US)

(73) Assignee: ZOLL Medical Corporation, Chelmsford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,351

(22) Filed: Nov. 17, 2022

(65) Prior Publication Data

US 2023/0075376 A1 Mar. 9, 2023

Related U.S. Application Data

(63) Continuation of application No. 16/656,769, filed on Oct. 18, 2019, now Pat. No. 11,534,365, which is a (Continued)

(51) Int. Cl.
*A61H 31/00* (2006.01)

(52) U.S. Cl.
CPC ......... *A61H 31/005* (2013.01); *A61H 31/007* (2013.01); *A61H 2201/107* (2013.01);
(Continued)

(58) Field of Classification Search
CPC ................ A61H 31/005; A61H 31/007; A61H 2201/5089; A61H 2201/5064;
(Continued)

(56) References Cited

U.S. PATENT DOCUMENTS

| | | | |
|---|---|---|---|
| 443,204 | A | 12/1890 | Davis |
| 651,962 | A | 6/1900 | Boghean |

(Continued)

FOREIGN PATENT DOCUMENTS

| | | | |
|---|---|---|---|
| CN | 1458852 | A | 11/2003 |
| CN | 1723057 | A | 1/2006 |

(Continued)

*Primary Examiner* — Justine R Yu
*Assistant Examiner* — Matthew R Moon
(74) *Attorney, Agent, or Firm* — The Webb Law Firm

(57) ABSTRACT

A system for monitoring performance of a resuscitation activity on a patient by an acute care provider is provided. The system includes: a first wearable sensor configured to sense movement of a first portion of an acute care provider's hand; a second wearable sensor configured to sense movement of a second portion of the acute care provider's hand; and a controller. The controller is configured to: receive and process signals representative of performance of a resuscitation activity from the first sensor and the second sensor; identify from the processed signals information indicative of at least one of a relative distance, a relative orientation, a change in relative distance and a change in relative orientation between the first sensor and the second sensor during performance of the resuscitation activity; and determine at least one resuscitation activity parameter based, at least in part, on the identified information.

23 Claims, 16 Drawing Sheets

Related U.S. Application Data continuation of application No. 15/281,395, filed on Sep. 30, 2016, now Pat. No. 10,492,986.

(52) U.S. Cl.
CPC .................. *A61H 2201/165* (2013.01); *A61H 2201/1635* (2013.01); *A61H 2201/5023* (2013.01); *A61H 2201/5064* (2013.01); *A61H 2201/5084* (2013.01); *A61H 2201/5087* (2013.01); *A61H 2201/5089* (2013.01); *A61H 2201/5097* (2013.01)

(58) Field of Classification Search
CPC .... A61H 2201/5084; A61H 2201/5023; A61H 2201/1635; A61H 2201/107; A61H 2201/5097; A61H 2201/165; A61H 2201/5087
See application file for complete search history.

(56) References Cited

U.S. PATENT DOCUMENTS

| | | | | |
|---|---|---|---|---|
| 2,071,215 | A | 2/1937 | Petersen | |
| 2,486,667 | A | 11/1949 | Meister | |
| RE26,511 | E | 12/1968 | Hewson | |
| 4,424,806 | A | 1/1984 | Newman et al. | |
| 4,554,910 | A | 11/1985 | Lally | |
| 4,676,236 | A | 6/1987 | Piorkowski et al. | |
| 4,770,164 | A | 9/1988 | Lach et al. | |
| 4,928,674 | A | 5/1990 | Halperin et al. | |
| 4,932,879 | A | 6/1990 | Ingenito et al. | |
| 4,987,783 | A | 1/1991 | D'Antonio et al. | |
| 4,989,611 | A | 2/1991 | Zanetti et al. | |
| 5,453,081 | A | 9/1995 | Hansen | |
| 5,490,820 | A | 2/1996 | Schock et al. | |
| 5,496,257 | A | 3/1996 | Kelly | |
| 5,533,181 | A | 7/1996 | Bergsneider | |
| 5,738,637 | A | 4/1998 | Kelly et al. | |
| 5,743,864 | A | 4/1998 | Baldwin, II | |
| 5,831,164 | A | 11/1998 | Reddi et al. | |
| 5,844,482 | A | 12/1998 | Guthrie et al. | |
| 6,013,041 | A | 1/2000 | Eathers | |
| 6,027,452 | A | 2/2000 | Flaherty et al. | |
| 6,174,395 | B1 | 1/2001 | Soriano | |
| 6,301,964 | B1 | 10/2001 | Fyfe et al. | |
| 6,406,427 | B1 | 6/2002 | Williams et al. | |
| 7,074,199 | B2 | 7/2006 | Halperin et al. | |
| 7,108,665 | B2 | 9/2006 | Halperin et al. | |
| 7,429,250 | B2 | 9/2008 | Halperin et al. | |
| 7,650,181 | B2 | 1/2010 | Freeman et al. | |
| 7,805,114 | B1 | 9/2010 | Quintana et al. | |
| 8,827,721 | B2 | 9/2014 | Totman | |
| 8,880,166 | B2 | 11/2014 | Tan et al. | |
| 9,125,793 | B2 | 9/2015 | Palazzolo et al. | |
| 9,522,096 | B2 | 12/2016 | Jensen et al. | |
| 9,562,817 | B2 | 2/2017 | Adamski et al. | |
| 9,872,628 | B2 | 1/2018 | Hyde et al. | |
| 10,046,114 | B1 | 8/2018 | Biederman et al. | |
| 10,492,986 | B2 * | 12/2019 | Giacometti | A61H 31/007 |
| 11,534,365 | B2 * | 12/2022 | Giacometti | A61H 31/007 |
| 2001/0011159 | A1 | 8/2001 | Cantrell et al. | |
| 2002/0133197 | A1 | 9/2002 | Snyder et al. | |
| 2004/0015191 | A1 | 1/2004 | Otman et al. | |
| 2004/0082888 | A1 | 4/2004 | Palazzolo et al. | |
| 2004/0162585 | A1 | 8/2004 | Elghazzawi et al. | |
| 2006/0056655 | A1 | 3/2006 | Wen et al. | |
| 2006/0116724 | A1 | 6/2006 | Snyder | |
| 2006/0173501 | A1 | 8/2006 | Stickney et al. | |
| 2008/0171311 | A1 | 7/2008 | Centen et al. | |
| 2008/0312565 | A1 | 12/2008 | Celik-Butler et al. | |
| 2008/0319279 | A1 | 12/2008 | Ramsay et al. | |
| 2009/0240295 | A1 | 9/2009 | Kellum | |
| 2009/0270931 | A1 | 10/2009 | Liden | |
| 2010/0211127 | A1 | 8/2010 | Eerden | |
| 2010/0248679 | A1 | 9/2010 | Oei et al. | |
| 2010/0256539 | A1 | 10/2010 | Strand et al. | |
| 2011/0117878 | A1 | 5/2011 | Barash et al. | |
| 2011/0172550 | A1 | 7/2011 | Martin et al. | |
| 2011/0213216 | A1 | 9/2011 | McKenna et al. | |
| 2011/0302694 | A1 * | 12/2011 | Wang | A61B 5/6806 2/160 |
| 2012/0075464 | A1 | 3/2012 | Derenne et al. | |
| 2012/0083270 | A1 * | 4/2012 | Robbins | H04W 12/08 455/435.1 |
| 2012/0083720 | A1 | 4/2012 | Centen et al. | |
| 2012/0089054 | A1 * | 4/2012 | Centen | G09B 23/288 601/41 |
| 2012/0112903 | A1 | 5/2012 | Kaib et al. | |
| 2012/0123224 | A1 | 5/2012 | Packer et al. | |
| 2012/0191014 | A1 | 7/2012 | Fossan | |
| 2012/0195473 | A1 | 8/2012 | De Haan et al. | |
| 2012/0330200 | A1 * | 12/2012 | Voss | A61H 31/004 601/41 |
| 2013/0138168 | A1 | 5/2013 | Quan et al. | |
| 2013/0197399 | A1 | 8/2013 | Montgomery | |
| 2013/0282068 | A1 | 10/2013 | Sagiroglu et al. | |
| 2013/0296719 | A1 | 11/2013 | Packer et al. | |
| 2013/0310718 | A1 | 11/2013 | Jensen et al. | |
| 2014/0201627 | A1 | 7/2014 | Freeman et al. | |
| 2014/0342331 | A1 | 11/2014 | Freeman | |
| 2014/0365175 | A1 | 12/2014 | Packer et al. | |
| 2015/0087919 | A1 | 3/2015 | Johnson et al. | |
| 2015/0088016 | A1 | 3/2015 | Fleischacker et al. | |
| 2015/0120201 | A1 * | 4/2015 | Silver | A61B 5/103 702/19 |
| 2015/0238722 | A1 | 8/2015 | Al-Ali | |
| 2016/0128633 | A1 | 5/2016 | Silver et al. | |
| 2017/0154230 | A1 * | 6/2017 | Dow | G06V 30/2276 |
| 2017/0181925 | A1 * | 6/2017 | Oppenheimer | A61H 31/007 |

FOREIGN PATENT DOCUMENTS

| | | | |
|---|---|---|---|
| CN | 1750857 | A | 3/2006 |
| CN | 101001668 | A | 7/2007 |
| CN | 201346293 | Y | 11/2009 |
| DE | 102015210142 | A1 | 12/2016 |
| KR | 1020140140700 | A | 12/2014 |

* cited by examiner

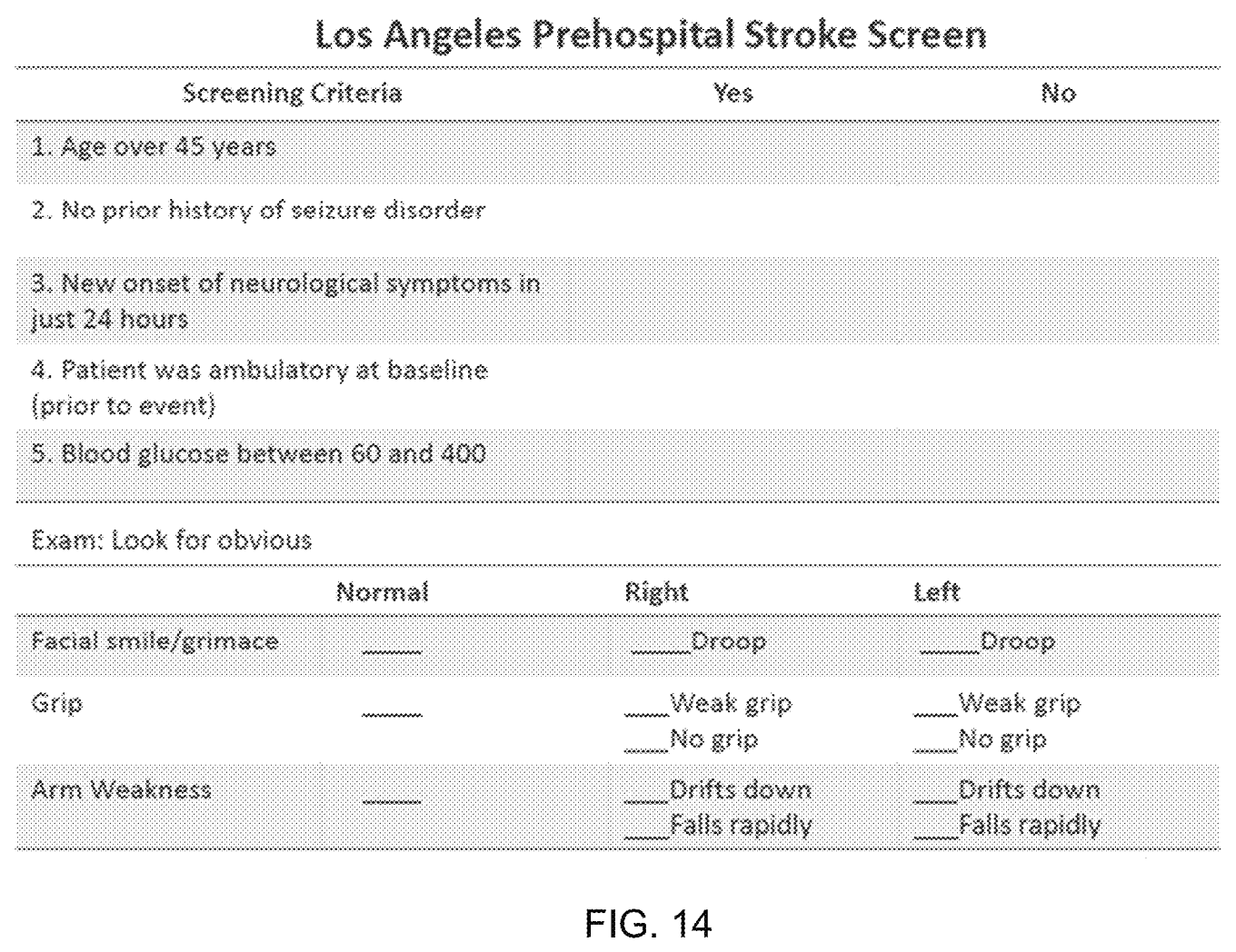

Los Angeles Prehospital Stroke Screen

| Screening Criteria | Yes | No |
|---|---|---|
| 1. Age over 45 years | | |
| 2. No prior history of seizure disorder | | |
| 3. New onset of neurological symptoms in just 24 hours | | |
| 4. Patient was ambulatory at baseline (prior to event) | | |
| 5. Blood glucose between 60 and 400 | | |

Exam: Look for obvious

| | Normal | Right | Left |
|---|---|---|---|
| Facial smile/grimace | _____ | _____Droop | _____Droop |
| Grip | _____ | ____Weak grip<br>____No grip | ____Weak grip<br>____No grip |
| Arm Weakness | _____ | ____Drifts down<br>____Falls rapidly | ____Drifts down<br>____Falls rapidly |

FIG. 14

WEARABLE SENSOR DEVICES AND SYSTEMS FOR PATIENT CARE

CROSS-REFERENCE TO RELATED APPLICATIONS

The present application is a continuation of U.S. patent application Ser. No. 16/656,769, filed Oct. 18, 2019, which is a continuation of U.S. patent application Ser. No. 15/281,395, filed Sep. 30, 2016, which issued as U.S. Pat. No. 10,492,986, the entire disclosures of which are hereby incorporated by reference.

BACKGROUND

Technological Field

The present disclosure is related to cardiac resuscitation and, more specifically, to wearable devices and systems for assisting acute care providers in performing resuscitation activities.

Description of Related Art

Acute care is delivered to patients in emergency situations in the pre-hospital and hospital settings for patients experiencing a variety of acute medical conditions involving the timely diagnosis and treatment of disease states that, left alone, will likely degenerate into a life-threatening condition and, potentially, death within a period of 72 hours or less. Stroke, dyspnea (difficulty breathing), traumatic arrest, myocardial infarction and cardiac arrest are a few examples of disease states for which acute care is delivered to patients in an emergency setting. Acute care comprises different treatment and/or diagnosis, depending upon the disease state.

One example of acute care is cardio-pulmonary resuscitation (CPR), which is a process by which one or more acute care providers may attempt to resuscitate a patient who may have suffered an adverse cardiac event by taking one or more actions, for example, providing chest compressions and ventilation to the patient. During the first five to eight minutes after CPR efforts begin, chest compressions are an important element of CPR because chest compressions help maintain blood circulation through the body and in the heart itself. Ventilation is also key part of CPR because ventilations help to provide gas exchange (e.g., oxygen supply and carbon dioxide deposit) for the circulating blood.

CPR may be performed by a team of one or more acute care provider, for example, an emergency medical services (EMS) team made up of emergency medical technicians (EMTs), a hospital team including medical caregivers (e.g., doctors, nurses, etc.), and/or bystanders responding to an emergency event. In some instances, one acute care provider can provide chest compressions to the patient, while another provides ventilations to the patient. The chest compressions and ventilations may be coordinated according to an appropriate CPR protocol. When professionals such as EMTs provide care, ventilation may be provided via a ventilation bag, rather than by mouth-to-mouth. CPR can be performed in conjunction with electrical shocks to the patient provided by an external defibrillator, such as an automatic external defibrillator (AED). AEDs can provide instructions (e.g., in the form of audible feedback) to acute care providers, such as "Push Harder," (when the acute care provider is not performing chest compressions according to the desired depth), "Stop CPR," and/or "Stand Back" (because a rhythm analysis is needed and/or a shock is about to be delivered). In order to determine the quality of chest compressions being performed, some defibrillators may obtain information from one or more accelerometers (such as those which are provided with CPR D PADZ®, CPR STAT PADZ®, and ONE STEP™ pads made by ZOLL MEDICAL of Chelmsford, Mass.). The accelerometer data can be used to determine chest compression rate and depth. If the compressions are determined to be too shallow or too deep with respect to set guidelines, feedback can be provided to the acute care provider to improve chest compression quality.

SUMMARY

According to an aspect of the disclosure, a system for monitoring performance of a resuscitation activity on a patient by an acute care provider is provided. The system comprises: a first wearable sensor configured to sense movement of a first portion of an acute care provider's hand; a second wearable sensor configured to sense movement of a second portion of the acute care provider's hand; and a controller. The controller is configured to: receive and process signals representative of performance of a resuscitation activity from the first sensor and the second sensor; identify from the processed signals information indicative of at least one of a relative distance, a relative orientation, a change in relative distance and a change in relative orientation between the first sensor and the second sensor during performance of the resuscitation activity; and determine at least one resuscitation activity parameter based, at least in part, on the identified information.

According to another aspect of the disclosure, a system for obtaining a record of resuscitation activities performed by an acute care provider for a patient is provided. The system comprises: at least one motion sensor wearable on the acute care provider's hand and configured to sense movement of the acute care provider's hand during performance of one or more resuscitation activities by the acute care provider; and a controller. The controller is configured to: receive and process a signal from the at least one motion sensor to identify a resuscitation activity being performed; and automatically record a time-stamped marker for the identified resuscitation activity.

According to another aspect of the disclosure, a system for monitoring resuscitation of a patient is provided. The system comprises: at least one sensor configured to be worn by an acute care provider for receiving signals representative of objects and/or devices located in proximity to the acute care provider; and a controller in communication with the at least one sensor. The controller is configured to: receive and process signals from the at least one sensor; and determine a resuscitation activity being performed by the acute care provider based, at least in part, on the received and processed signals.

Examples of the present invention will now be described in the following numbered clauses:

Clause 1: A system for monitoring performance of a resuscitation activity on a patient by an acute care provider, the system comprising: a first wearable sensor configured to sense movement of a first portion of an acute care provider's hand; a second wearable sensor configured to sense movement of a second portion of the acute care provider's hand; and a controller configured to: receive and process signals representative of performance of a resuscitation activity from the first sensor and the second sensor; identify from the processed signals information indicative of at least one of a relative distance, a relative orientation, a change in relative distance and a change in relative orientation between the first sensor and the second sensor during performance of the resuscitation activity; and determine at least one resuscitation activity parameter based, at least in part, on the identified information.

Clause 2: The system of clause 1, wherein the resuscitation activity parameter comprises one or more of compression depth, compression rate, ventilation volume, and ventilation rate.

Clause 3: The system of clause 1 or clause 2, further comprising a feedback device, wherein the controller is configured to cause the feedback device to provide feedback to the acute care provider about performance of the resuscitation activity based, at least in part, on the determined resuscitation activity parameter.

Clause 4: The system of clause 3, wherein the feedback device comprises one or more of a haptic output component, a visual indication component, and an audio output component.

Clause 5: The system of clause 3 or clause 4, wherein the feedback is based on a comparison between the determined resuscitation activity parameter and target performance values for the resuscitation activity being performed.

Clause 6: The system of clause 5, wherein the controller is configured to cause the feedback device to provide feedback according to varying haptic patterns to the acute care provider regarding performance of the resuscitation activity, the varying haptic patterns being based on a comparison of the determined resuscitation activity parameter and the target performance values.

Clause 7: The system of clause 3, wherein the feedback device comprises a haptic output component, and wherein the controller is configured to cause the haptic output component to provide vibration according to a first haptic pattern to encourage the acute care provider in performance of the resuscitation activity and according to a second haptic pattern to instruct the acute care provider to modify performance of the resuscitation activity.

Clause 8: The system of clause 7, wherein the first haptic pattern and/or the second haptic pattern comprise one or more of a low intensity vibration, a high intensity vibration, a vibration having an intensity that varies in a saw tooth pattern, a pulse vibration at predetermined intervals, and/or a vibration including groups of haptic pulses of predetermined intensity and duration followed by intervals without haptic pulses.

Clause 9: The system of clause 3, wherein the feedback component comprises a haptic output component and an audio feedback component, and wherein the controller is configured to cause the audio feedback component to provide audio feedback to encourage the acute care provider to perform a first aspect of the resuscitation activity and cause the haptic output component to provide feedback to encourage the acute care provider to perform a second aspect of the resuscitation activity.

Clause 10: The system of any of clauses 4 to 9, wherein the haptic output component comprises one or more linear vibrating motors.

Clause 11: The system of any of clauses 4 to 9, wherein the haptic output component comprises an annular or partially annular vibrating motor.

Clause 12: The system of any of clauses 1 to 11, further comprising at least one wireless transmitter associated with the first sensor and/or the second sensor, the at least one wireless transmitter being configured to wirelessly transmit the signals received from the sensors to the controller.

Clause 13: The system of any of clauses 1 to 12, further comprising a wireless transceiver associated with the controller, the transceiver being configured to receive wireless signals from the first sensor and/or the second sensor and to transmit information based on the received signals to a remote computing device.

Clause 14: The system of clause 13, wherein the remote computing device comprises one or more of a portable computer, smartphone, laptop computer, and computer network.

Clause 15: The system of clause 13 or clause 14, wherein the wireless transceiver comprises a device using one or more of Bluetooth, Zigbee, cellular, 3G, 4G, and Wi-Fi data transmission protocols.

Clause 16: The system of any of clauses 13 to 15, wherein the controller is configured to determine location and/or proximity information for the first sensor and/or the second sensor based, at least in part, on a quality of the signals wirelessly received by the wireless transceiver.

Clause 17: The system of clause 16, wherein the controller is configured to determine the resuscitation activity being performed based, at least in part, on the determined location and/or proximity information for the wearable device.

Clause 18: The system of any of clauses 1 to 17, wherein the first sensor is configured to sense movement of the acute care provider's thumb and the second sensor is configured to sense movement of one of the acute care provider's fingers.

Clause 19: The system of any of clauses 1 to 18, further comprising a glove, wherein the first motion sensor and the second motion sensor are integrated with and/or attached to the glove.

Clause 20: The system of any of clauses 1 to 18, wherein the first sensor and/or the second sensor are disposed in ring-shaped housings, the housing being configured to be worn about the acute care provider's thumb or a finger.

Clause 21: The system of any of clauses 1 to 20, wherein the resuscitation activity comprises performance of chest compressions for an infant, and wherein the resuscitation activity parameter comprises changes in anterior/posterior distance for the compressions.

Clause 22: The system of any of clauses 1 to 21, wherein the resuscitation activity comprises manually compressing a ventilation bag, and wherein the resuscitation activity parameter comprises at least one of air volume expelled from the bag by the compression and flow rate of air expelled from the bag.

Clause 23: The system of any of clauses 1 to 22, wherein the resuscitation activity comprises administering a therapeutic agent to the patient using a syringe, and wherein the resuscitation activity parameter comprises one or more of injection volume, unused fluid volume in the syringe, and injection flow rate.

Clause 24: The system of any of clauses 1 to 23, further comprising a proximity sensor configured to be worn by the acute care provider for identifying a position of the acute care provider relative to the patient, other medical devices at the emergency scene, and/or other acute care providers at the emergency scene.

Clause 25: The system of clause 24, wherein the proximity sensor comprises a near-field communication sensor configured to identify one or more radio-frequency signals in proximity to the wearable device.

Clause 26: The system of clause 25, wherein the controller is configured to receive the radio-frequency signals identified by the near-field communication sensor and to identify the resuscitation activity being performed and/or determine the resuscitation activity parameters based, at least in part, on the radio-frequency signals.

Clause 27: The system of any of clauses 1 to 26, wherein the controller is configured to identify a resuscitation activity being performed by the acute care provider based, at least in part, on the signals received from the first sensor and/or the second sensor.

Clause 28: The system of any of clauses 1 to 27, wherein the first sensor and/or the second sensor are configured to sense one or more of position, rotation, and/or tilt of an acute care provider's hand during performance of the resuscitation activity.

Clause 29: The system of clause 28, wherein the first sensor and/or the second sensor comprise a single axis accelerometer, a multi-axis accelerometer, and/or a gyroscope.

Clause 30: The system of any of clauses 1 to 29, further comprising a ventilation unit, the ventilation unit comprising: a manual ventilation bag, an airflow path extending from the ventilation bag to the patient; and an airflow sensor positioned to sense flow rate for air in the airflow path, wherein the airflow sensor is configured to wirelessly transmit sensed data to the controller, and wherein the controller is configured to wirelessly receive the data from the airflow sensor and determine the resuscitation activity parameter based, at least in part, on the received data from the airflow sensor.

Clause 31: The system of any of clauses 1 to 18, wherein the first wearable sensor and/or the second wearable sensor each comprise an adhesive substrate for adhering the sensor to a portion of the acute care provider's hand.

Clause 32: A system for obtaining a record of resuscitation activities performed by an acute care provider for a patient, the system comprising: at least one motion sensor wearable on the acute care provider's hand and configured to sense movement of the acute care provider's hand during performance of one or more resuscitation activities by the acute care provider; and a controller configured to: receive and process a signal from the at least one motion sensor to identify a resuscitation activity being performed; and automatically record a time-stamped marker for the identified resuscitation activity.

Clause 33: The system of clause 32, wherein the controller is further configured to automatically record identifying information about the acute care provider who performed the resuscitation activity and to determine whether to perform additional resuscitation activities.

Clause 34: The system of clause 32 or clause 33, further comprising a near-field communication sensor configured to be worn by the acute care provider, the near-field communication sensor being configured to sense radio-frequency signals emitted from emitters located in proximity to the acute care provider.

Clause 35: The system of any of clauses 32 to 34, further comprising an output component, wherein the controller is configured to cause the output component to provide a notification to the acute care provider to perform one or more resuscitation activities according to a predetermined treatment protocol.

Clause 36: The system of clause 35, further comprising transitory or non-transitory computer readable memory in communication with the controller, and wherein the treatment protocol is stored on the computer readable memory.

Clause 37: The system of clause 35 or clause 36, wherein the controller is configured to determine the treatment protocol based, at least in part, on a characteristic of the patient.

Clause 38: The system of clause 37, wherein the characteristic of the patient comprises one or more of patient present condition, patient medical history, patient age, and patient height/weight.

Clause 39: The system of any of clauses 32 to 38, wherein the controller is configured to schedule a time to perform a subsequent resuscitation activity based on the marker and cause an output component to provide a notification to the acute care provider to perform the subsequent resuscitation activity at the scheduled time.

Clause 40: The system of any clauses 32 to 39, further comprising a wireless transmitter located in proximity to the acute care provider, the wireless transceiver being configured to transmit signals from the at least one sensor to the controller.

Clause 41: The system of any of clauses 32 to 40, further comprising a wireless transceiver in communication with the controller, the wireless transceiver being configured to receive signals from the at least one sensor and to transmit information about the marker to a remote computing device.

Clause 42: The system of any of clauses 32 to 41, wherein the one or more resuscitation activities comprise one or more of performing chest compressions, manual or automatic ventilation, setting-up a medical device at an emergency scene, administering medications to the patient, monitoring patient vital signs, coordinating transportation of the patient from the emergency scene to a medical facility, and coordinating exchange of responsibility for treatment of the patient upon arrival at the medical facility.

Clause 43: The system of any of clauses 32 to 42, wherein the controller is further configured to: associate each of the at least one motion sensors with a respective acute care provider at an emergency scene; assign a role to each respective acute care provider based, at least in part, on the identified resuscitation activity performed by the respective acute care provider; and cause a feedback device associated with each respective acute care provider to provide feedback to the acute care provider for performance of the identified resuscitation activity.

Clause 44: The system of clause 43, wherein the controller is further configured to output a summary of care for treatment of the patient including a time-stamped record of identified markers associated with each respective acute care provider.

Clause 45: The system of any of clauses 32 to 44, further comprising a patient monitor in communication with the controller, the patient monitor comprising circuitry for sensing physiological signals of the patient, wherein the controller of the is configured to output a summary of care including physiological signals measured by the patient monitor correlated with the time-stamped record of identified markers.

Clause 46: The system of clause 45, wherein the controller is configured to identify and/or verify a marker based, at least in part, on analysis of measured physiological signals received from the patient monitor.

Clause 47: The system of any of clauses 32 to 46, wherein the at least one motion sensor comprises an adhesive substrate for adhering the sensor to a portion of the acute care provider's hand.

Clause 48: The system of clause 47, wherein the at least one motion sensor further comprises flexible circuitry, the flexible circuitry comprising components for sensing and wirelessly transmitting signals representative of movement of the acute care provider.

Clause 49: A system for monitoring resuscitation of a patient, the system comprising: at least one sensor configured to be worn by an acute care provider for receiving signals representative of objects and/or devices located in proximity to the acute care provider; and a controller in communication with the at least one sensor and configured to: receive and process signals from the at least one sensor; and determine a resuscitation activity being performed by the acute care provider based, at least in part, on the received and processed signals.

Clause 50: The system of clause 49, wherein the at least one sensor comprises a near-field communication sensor configured to receive radio frequency signals from emitters located in proximity to the acute care provider.

Clause 51: The system of clause 50, wherein the emitters comprise one or more RFID devices.

Clause 52: The system of any of clauses 49 to 51, further comprising a feedback component, wherein the controller is configured to cause the feedback component to provide feedback to the acute care provider about performance of the determined resuscitation activity based, at least in part, on the received and processed signals.

Clause 53: The system of clause 52, wherein the feedback comprises instructions for performing the resuscitation activity in accordance with a predetermined treatment protocol.

Clause 54: The system of clause 52 or clause 53, further comprising at least one motion sensor configured to sense movement representative of the resuscitation activity being performed, wherein the controller is configured to receive and process signals from the at least one motion sensor and determine a resuscitation activity parameter based on the received and processed signals.

Clause 55: The system of clause 54, wherein the feedback component is configured to provide feedback to the acute care provider regarding a quality of the resuscitation activity based on a comparison of the resuscitation activity parameter and one or more threshold values.

Clause 56: The system of any of clauses 49 to 55, further comprising a wireless transmitter for wirelessly transmitting signals from the at least one motion sensor to the controller, wherein the controller is configured to determine proximity and/or location of the acute care provider based, at least in part, on a quality of the received signals transmitted by the wireless transmitter.

Clause 57: The system of any of clauses 49 to 56, wherein the objects and/or devices located in proximity to the acute care provider comprise one or more of a chest compression assist device, a mechanical chest compression device, a defibrillator, a therapeutic electrode package, a patient monitor, a mechanical ventilator, a ventilation bag, an airflow sensor, a syringe, and a drug vial.

Clause 58: The system of any of clauses 49 to 57, wherein the at least one sensor comprises an adhesive substrate for adhering the sensor to a portion of the acute care provider's hand.

Clause 59: The system of clause 58, wherein the at least one sensor comprises flexible circuitry, the flexible circuitry comprising components for processing and wirelessly transmitting the received signals.

BRIEF DESCRIPTION OF THE DRAWINGS

These and other features and characteristics of the present disclosure, as well as the methods of operation, functions of related structures, combination of parts, and economies of manufacture thereof, will become more apparent upon consideration of the following description and the appended claims with reference to the accompanying drawings, all of which form part of this specification, wherein like reference numerals designate corresponding parts in the various figures. It is to be expressly understood, however, that the drawings are for the purpose of illustration and description only and are not intended as a definition of the limit of the invention.

FIG. 14 is an example of a patient assessment questionnaire to be used by an acute care provider when treating a patient undergoing a stroke.

DETAILED DESCRIPTION

Figure 1A:
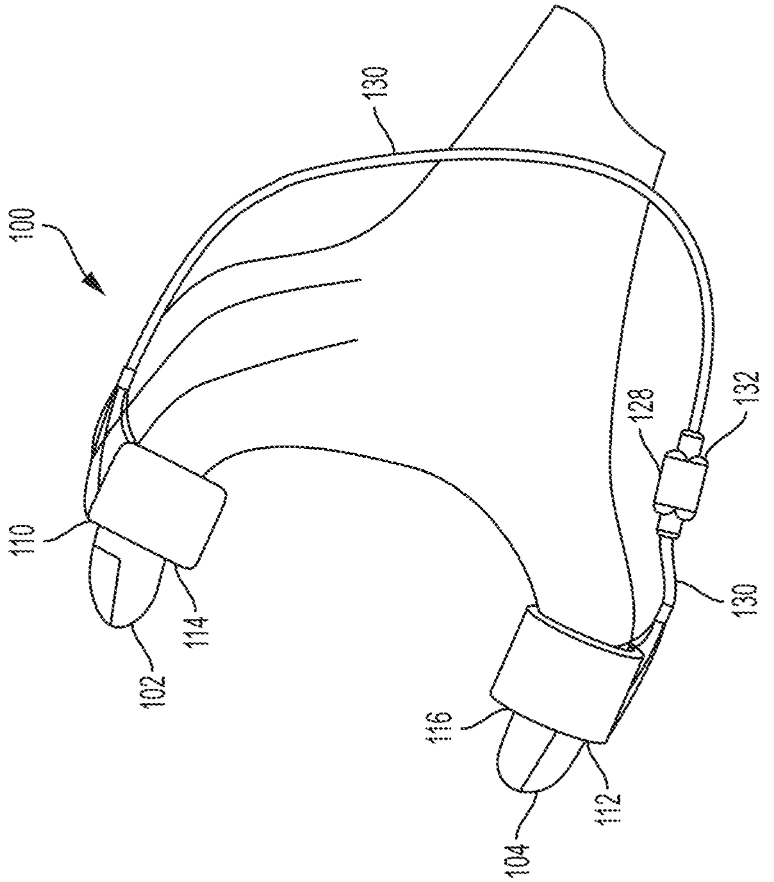
FIG. 1A is a schematic drawing of an exemplary monitoring system including exemplary wearable sensor devices worn by an acute care provider, according to an aspect of the disclosure.

According to an aspect of the present disclosure, a system for monitoring performance of resuscitation activities by acute care providers at an emergency scene is provided. The system can be configured to assist acute care providers in performance of the resuscitation activities by providing, for example, information about when to begin or cease resuscitation, guidance for performance of the resuscitation activities, feedback about quality of activities being performed, and/or to coordinate resuscitation activities performed by multiple acute care providers at the emergency scene. Resuscitation activities can comprise, for example, providing chest compressions, manual or automatic ventilation, monitoring and/or directing the progress of resuscitation performed by others, setting up monitoring and/or therapeutic medical devices (e.g., defibrillator, patient monitor, automated chest compressor, automated/manual ventilator, etc.), administering medications to the patient, monitoring patient vital signs, coordinating transportation of the patient from the emergency scene to a medical facility, and coordinating exchange of responsibility for treatment of the patient upon arrival at the medical facility, amongst others.

In an illustrative embodiment, the system may include two or more wearable sensors each configured to sense movement of respective parts of the acute care provider's hand. For example, a first wearable sensor may sense movement of a first portion of the acute care provider's hand, and a second wearable sensor may sense movement of a second portion of the acute care provider's hand. In such a case, a controller is employed to receive and process signals representative of the performance of a resuscitation activity from each of the sensors. The controller identifies from the processed signals information indicative of a number of parameters related to the motion, position, and/or orientation of the sensors, or to changes thereof relative to one another. Such parameters may include at least one of a relative distance, a relative orientation, a change in relative distance, and a change in relative orientation between the sensors during performance of the resuscitation activity. The controller may further determine at least one resuscitation activity parameter based, at least in part, on the identified information. It may be advantageous to employ wearable sensors described herein, for example, so as to allow motion, position and/or orientation information of particular regions of the rescuer's hands to be accurately measured.

In some examples, the system can be designed to provide information to the acute care providers in a substantially hands free manner, such as via audio or haptic feedback. Haptic feedback can be particularly effective in providing the acute care provider with information related to the resuscitation effort without detracting or distracting others from the task at hand. For instance, without adversely contributing to an otherwise chaotic environment, haptic feedback is able to signal the acute care provider in a manner that is imperceptible to other acute care providers and/or bystanders located in close proximity. In contrast, other types of feedback, such as visual or audio prompting, may be more likely to distract and/or confuse other acute care providers with messages not intended for their particular role in the resuscitative effort. As discussed herein, the system may be programmed to exhibit a number of different patterns of haptic feedback, and multiple patterns may be employed depending on the type of feedback or information intended to be provided to the acute care provider. For example, different patterns of haptic feedback may be used depending on the resuscitation activity being performed to provide the acute care provider with guidance as to how to more effectively perform particular CPR activities (e.g., chest compressions, ventilation bagging, etc.). In some cases, the haptic feedback may be provided based on activity information sensed by a motion sensor integrated into the wearable device. Such haptic feedback may further be based on a comparison of the acute care provider's current performance to a target performance of the resuscitation activities being performed.

The monitoring system may further be configured to provide the acute care provider with an alert notification of a related resuscitation activity. For example, in addition to providing resuscitation feedback, changing patterns of haptic signals may also be used to draw the acute care provider's attention away from the current task he/she is performing, and toward an alert notification, which may be of a higher priority for the acute care provider to address. In other examples, as discussed further below, the system may be configured to generate a code marker that provides a time-stamped record of a rescue event (e.g., drug infusion/administered, ventilations given, amongst others) for post-rescue event review. The system may further be configured to establish communication with an external device (e.g., defibrillator, monitor, tablet, external computer, etc.) for uploading the code marker thereto and for producing an appropriate summary record of the rescue event.

The monitoring system generally comprises wearable sensor device(s) configured to collect or receive information about the resuscitation activities being performed by acute care providers. The wearable sensor device(s) may comprise motion sensors for measuring movements as resuscitation activities are being performed by the acute care provider. The wearable devices may further comprise a number of additional sensors (e.g., pressure sensors, capacitive sensors, etc.) that may be useable to measure and/or record additional resuscitation parameters. In some embodiments, the wearable sensor device(s) may also comprise sensors configured to receive radio-frequency signals representative of objects and/or devices located at an emergency scene in proximity to the acute care provider. For example, the radio-frequency signals can be emitted from radio frequency identification (RFID) tags affixed to, for example, medical devices, tools, disposable items, and/or individuals at the emergency scene. Information about resuscitation activities performed by the acute care provider can be determined based on the received radio-frequency signals.

The wearable sensor device(s) are, desirably, small in size and can be worn discretely without impacting the acute care provider's ability to perform various rescue tasks. For example, the wearable sensor device(s) can comprise a ring that can be worn on an acute care provider's finger or thumb. In some embodiments, the wearable sensor device(s) can be embedded in or affixed to a garment, such as a glove. Or, the wearable sensor device(s) may be provided along with a small housing that is adhered or otherwise affixed to the acute care provider's hand. Advantageously, such wearable sensor device(s) can be worn by the acute care provider for extended periods of time (e.g., while traveling to an emergency scene, while performing resuscitation activities at the emergency scene, and while transporting the patient to a hospital following emergency treatment).

The wearable sensor device(s) are, desirably, easier and more convenient for acute care providers to set up and use compared to prior CPR assistance devices, such as accelerometer-based pucks. For example, prior CPR assistance devices are affixed to and/or placed in contact with the patient before beginning chest compressions. Accordingly, upon arrival at the emergency scene, the CPR assistance device must be correctly positioned on or adjacent to the patient. In contrast, the wearable sensor devices disclosed herein are worn by the acute care provider and do not need to be positioned before beginning treatment of the patient. For example, since wearable sensor devices can be small and discrete, acute care providers can wear them continuously for extended periods of time. In other examples, acute care providers may not necessarily wear the devices continuously, but may put them on while traveling to an emergency scene. As a result, acute care providers can begin providing treatment to the patient upon arrival at the emergency scene efficiently and without delays caused as acute care providers set up different monitoring devices.

Signals obtained from wearable sensors described herein may be used in combination with existing CPR assistance devices (e.g., accelerometer-based pucks or other motion sensors placed on the sternum of the patient). For example, such wearable sensors may be used to determine whether the rescuer's hands have come completely off of the chest. Or, even if the hands have fully released from the chest, the wearable sensors may be used to help determine whether the chest is able to recoil to an acceptable degree. It may be advantageous for the system to use signals from the wearable sensors and other compression sensors placed on the sternum, in the overall calculation of compression depth, to account for movement of the rescuer's hands off the chest.

In some examples, the wearable sensor device(s) provide improved accuracy compared to prior CPR assistance devices that comprise only pressure sensors, rather than motion sensors. Pressure sensors may provide an indication of an amount of force exerted against a patient's chest. However, pressure sensors are unable to directly record certain parameters such as displacement of the chest from pressure applied in both the anterior and posterior directions, in the manner provided by the wearable sensor device(s) disclosed herein. Further, pressure measured by pressure sensors may not correspond well to displacement of the chest if, for example, the patient is lying on a cushioned surface and/or if the patient is being lifted or partially lifted by the acute care provider, as is the case with infant or neonatal CPR. In addition, chest compliance may vary from subject to subject; not only that, but chest compliance of the same person may also vary. For example, the chest may experience softening as it is repeatedly compressed. In such cases, CPR assistance devices with pressure sensors may not provide suitable estimates of chest compression depth.

In some examples, the acute care provider wears multiple sensor devices, each comprising motion sensors, such as a first sensor device on a first portion of the acute care provider's hand and a second sensor device on another portion of the acute care provider's hand. The system may further comprise a controller or processing device for accumulating information from the multiple wearable sensor devices and for providing feedback to acute care providers based on comparisons of the received information. The feedback can be related to a quality of resuscitation activities performed by the acute care provider. In some embodiments, the controller or processor may be configured to process information received from the wearable devices to identify gestures performed by and/or positions/orientations of portions of the hand of the acute care provider, or to identify or associate a particular acute care provider with a respective wearable device.

Monitoring systems having multiple wearable sensor devices can have improved accuracy for determining resuscitation activity parameters (e.g., chest compression depth and rate) compared with systems that determine such parameters with a single accelerometer. For instance, the multiple wearable sensor device(s) may serve as reference points for one another to determine displacement and changes in orientation for each device relative to one another. Accordingly, information from the multiple wearable sensor devices can be compared to determine a more accurate estimate of movement of the acute care provider's hand. In other examples, information from the multiple wearable sensor devices can be compared to changes in distance between the sensor devices. Movement information from the multiple motion sensors can be used to identify a type of resuscitation activity being performed, determine a quality of the performed resuscitation activities, and, in some cases, to determine how and what types of feedback to provide to the user regarding performance of the resuscitation activities.

In various embodiments, a reference sensor disposed underneath or otherwise on the patient's back may be employed. Such a reference sensor may be, for example, a motion sensor (e.g., displacement sensor, velocity sensor, and/or accelerometer), a force sensor, or another suitable type of sensor for providing a reference point. Signals from the reference sensor may be used to enhance calculations in providing user feedback. In an example, if the patient is lying on a soft surface such as a mattress, the reference sensor may be used to increase overall accuracy in determining compression depth and/or rate.

As an example, discussed in greater detail herein, the monitoring system can determine whether an acute care provider is performing chest compressions solely by pressing against a patient's sternum (referred to as anterior-anterior (A-A) compressions) or compressions by squeezing the patient's chest and back together (referred to as anterior-posterior (A-P) compressions). Algorithms for calculating compression depth and rate are selected, in part, based on whether A-A compressions or A-P compressions are being performed. The monitoring system can also identify and provide feedback for other resuscitation activities including manual or automatic ventilation of a patient and/or administering a therapeutic agent with a syringe. Information about changes in distance between wearable sensor devices can be used to determine parameters, such as ventilation volume and fluid volume administered to the patient. As discussed herein, various portions of wearable devices may incorporate RFID sensors and/or short-range data transmission systems such as Bluetooth®. The strength of wireless signals from such systems may provide information from which the absolute distance between devices/sensors may be determined.

In some embodiments, an acute care provider may wear a single wearable sensor device. In that case, the single wearable sensor device may include other types of sensors in place of or in combination with motion sensors, to provide additional information about the acute care provider and/or resuscitation activities being performed. For example, communications sensors may be used to obtain information from other electronic devices located in proximity to the wearable sensor device. In other examples, input components (such as microphones) may be included to receive information (e.g., speech) directly from the acute care provider. For example, speech recognition software may be employed to process speech to determine the type of action/marker being input. As discussed further herein, a lead acute care provider may instruct others to perform bag ventilations, chest compressions, switching activities, injecting drug(s), etc., and the system may generate markers that include a time-stamped record of activities. Following upon this example, and in combination with RFID tagging of syringes, if a drug was instructed to be delivered, but the wrong drug was scanned or otherwise indicated, an alarm or another type of feedback/instruction may be triggered.

The wearable sensor device(s) and/or controller can be in communication with other computerized device(s), and configured to divide or share data processing and data transmission functions with the other device(s). For example, the wearable sensor device(s) can be in communication with a smartphone, computer, defibrillator, monitor, and/or tablet PC by a short-range data transmitter or transceiver, such as a transceiver using the Bluetooth® data transmission protocol. In some embodiments, the wearable sensor device may be configured to send and/or receive information from and/or about one or more defibrillators. Data collected by the wearable sensor device can be transmitted from the wearable device to the smartphone or computer. On the smartphone, the received data can be processed and transmitted to an external source by a long-range transceiver (e.g., a cellular or Wi-Fi transceiver) integrated with the smartphone.

According to another aspect of the disclosure, a rescue management system including wearable sensor device(s) in communication with a rescue management device is disclosed. The rescue management device can be configured to coordinate resuscitation activities between multiple acute care providers and, for example, to assign roles or tasks for respective acute care providers at the emergency scene. Such a device may also be configured to detect the type of task the acute care provider is performing and, if he/she is performing a different task than what is assigned, may provide an appropriate alert, for example, to a supervisor and/or the acute care provider directly. The rescue management device can be a dedicated electronic device, which can be portable and taken to an emergency scene, mounted to an emergency vehicle such as an ambulance, or a remote computer device accessible by wired or wireless communication circuitry from the emergency scene. In other examples, the rescue management device can be a portable multipurpose electronic device, such as a laptop computer, defibrillator, monitor, tablet PC, and/or smartphone.

In some embodiments, the rescue management system may be configured to associate each of the wearable electronic devices with a respective role assigned to the acute care provider to assist the acute care provider in fulfilling a treatment protocol corresponding to the assigned role. In some instances, the system may be configured to provide the acute care provider with resuscitation information associated with his/her assigned role. For instance, the system may provide prompts for respective acute care providers according to the appropriate time in which they are to act when a particular protocol is enabled. As an example, if a 30-2 chest compression-ventilation protocol is selected in the management system, the system might alert the person assigned to ventilation when it is time to ventilate (e.g., bag), and/or may alert the compressor when a suitable time is to perform compressions. The system may also coach the acute care providers to follow the appropriate protocol. By providing only the relevant information associated with the assigned role, the acute care provider may be spared from the possibility of information overload, which may commonly occur if information related to other treatment protocols or roles are also being provided. In some embodiments, the wearable electronic device may be configured to receive information related to a particular resuscitation role assigned to the acute care provider, and may further provide resuscitation information related to the treatment protocol corresponding to the assigned resuscitation role.

The rescue management device may also be configured to receive information from the wearable electronic device(s) to automatically provide a time-stamped record of acute care provider activities. In some cases, the system may output a code review summary having information indicative of the quality of care of each of the acute care providers based on such a record. Oftentimes, in a code review summary provided to rescue personnel for the purposes of post-rescue evaluation, there are distinct periods in which the quality of CPR will vary. However, it is difficult to delineate which acute care provider performed which specific activity during those periods. Hence, it is challenging to determine which acute care provider(s) performed high quality CPR and which acute care provider(s) performed sub-optimal CPR. Accordingly, for various embodiments, the system may associate each of the wearable devices with a respective acute care provider, and provide a time-stamped record of activity for each particular acute care provider. Thus, it may be straightforward to determine from the final code review summary the quality of care that was provided by each acute care provider.

Figure 1C:
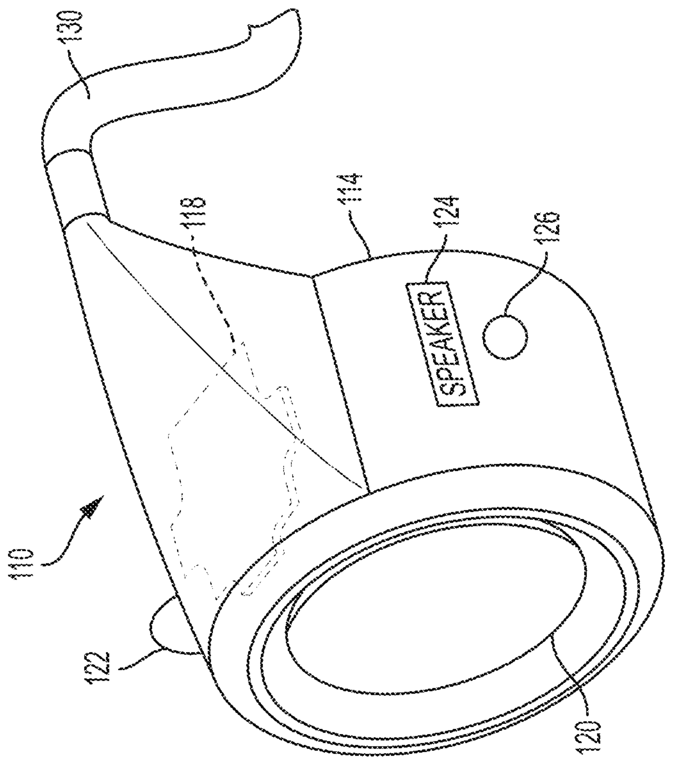
FIG. 1C is a schematic drawing of one of the exemplary wearable sensor devices of the system of FIG. 1A.
Figure 1B:
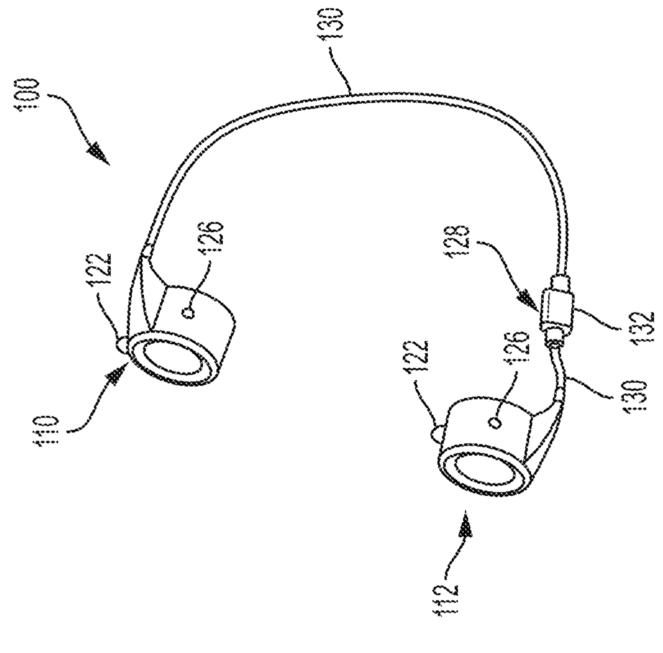
FIG. 1B is another schematic drawing of the exemplary system of FIG. 1A.

Exemplary Monitoring Systems:

With reference to FIGS. 1A to 1C, an exemplary system 100 for monitoring resuscitation activities performed by an acute care provider is illustrated. The system 100 comprises one or more wearable sensor(s) or wearable sensor device(s) 110, 112 configured to be worn on or adjacent to an acute care provider's fingers or hands. The system 100 can be configured to detect movement of the hands and/or fingers based on signals from the sensor device(s) 110, 112 and, in some instances, to detect and quantify changes in distance between the acute care provider's fingers using algorithms and processing routines described herein. The sensor device(s) 110, 112 can include a first sensor device 110 configured to sense movement of a first portion of the acute care provider's hand and a second sensor device 112 configured to sense movement of a second portion of the acute care provider's hand. For example, as shown in FIG. 1A, the first sensor device 110 may be worn on and configured to sense movement of the acute care provider's index finger 102 and the second sensor device 112 may be worn on and configured to sense measurement movement of the thumb 104.

Exemplary External Features:

In some examples, the sensor device(s) 110, 112 comprise sensor housings 114, 116, enclosing electronic circuitry 118 (shown in FIG. 1C). The housing(s) 114, 116 can be ring shaped, having an external appearance similar to toy or stage jewelry. Although, it can be appreciated that the housing(s) are not necessarily ring-shaped; for example, the housing(s) may be in the shape of a partial ring, which may accommodate varying finger diameters. The housing(s) 114, 116 can be formed from a suitable protective material, such as a hard plastic or metal (e.g., brushed aluminum). While the sensor housings 114, 116 illustrated in FIGS. 1A to 1C are substantially ring-shaped with a circular inner edge defining an opening 120 (shown in FIG. 1C) to receive the acute care provider's finger, other designs and/or arrangements can also be provided. For example, the sensor device(s) 110, 112 can comprise non-annular housing(s) attached to a clip, clamp, pin, strap, band, ribbon, or adhesive surface for attaching and/or affixing the sensor device(s) 110, 112 to the acute care provider's finger(s) and/or hand(s). Additionally, in some examples, the housing(s) 114, 116 can be of an appropriate size and shape to be worn on other fingers, palm, and/or other portions of the acute care provider's hands, wrists, or arms. For example, one of the sensor device(s) 110, 112 can be sized to be worn as a bracelet around the acute care provider's wrist.

As described in further detail in connection with FIG. 5, the electronic circuitry 118 can be configured to sense information representative of movement, position, and/or orientation of respective portions of the patient's fingers and hands, process the sensed information to determine, for example, acceleration, position, orientation and/or direction changes of the fingers and/or hands, and store the information on associated computer readable memory. Optionally, the electronic circuitry 118 may also be configured to calculate changes in relative distance, position, orientation between the sensor device(s) 110, 112 and to transmit the determined distances to remote sources for further processing and/or for providing feedback to the acute care provider about the resuscitation activity being performed. Alternatively, information sensed by the sensor device(s) 110, 112 can be transmitted to remote electronic and/or computerized devices for processing and analysis including calculation of changes in distance between the wearable sensor device(s) 110, 112.

With specific reference to FIG. 1C, the sensor device 110 can further comprise one or more output components capable of providing, for example, visual, haptic, and/or audio feedback to the acute care provider. In some implementations, the output components can comprise one or more visual indicators 122 located on and/or protruding through the device housing 114, 116 for conveying feedback, information, alerts, and/or notifications to the acute care provider. In some examples, the visual indicators 122 may be colored lights (e.g., LEDs) configured to turn-on, blink, or flash to convey feedback about performance of resuscitation activities to the acute care provider. In other examples, the visual indicators 122 can be LEDs or light bulbs enclosed within a device housing(s) 114, 116 formed from a transparent or translucent material. The sensor device 110 can further comprise audio output components, such as a speaker 124, for emitting audible feedback and alerts. The sensor device(s) 110, 112 can also comprise audio input components, such as a microphone port 126, for recording acute care provider speech and/or environment noise at the emergency scene. As discussed herein in connection with FIG. 5, the sensor device 110 may also comprise haptic feedback components, such as vibrating motors, for providing haptic feedback and/or information to acute care providers.

As shown in FIGS. 1A and 1B, in some examples, the system 100 may further comprise a processing and data transmission device (referred to herein as a controller device 128) in electrical communication with the sensor device(s) 110, 112 for receiving, processing, and transmitting information from the sensor device(s) 110, 112. In some examples, the controller device 128 comprises a housing 132 enclosing processing circuitry and a data transmitter. The controller device 128 can be attached or connected to a portion of the acute care provider's hand or arm. For example, the controller device 128 can include a clip or bracelet for mounting the controller device 128 to a portion of the acute care provider's hand or wrist. Alternatively, as shown in FIGS. 1A and 1B, the controller device 128 may hang freely on a cable 130 or dongle extending between the sensor devices 110, 112. The controller device 128 can further comprise additional output components for providing alerts, notification, and feedback to the acute care provider in a similar manner to the visual and audio components discussed herein.

Figure 2A:
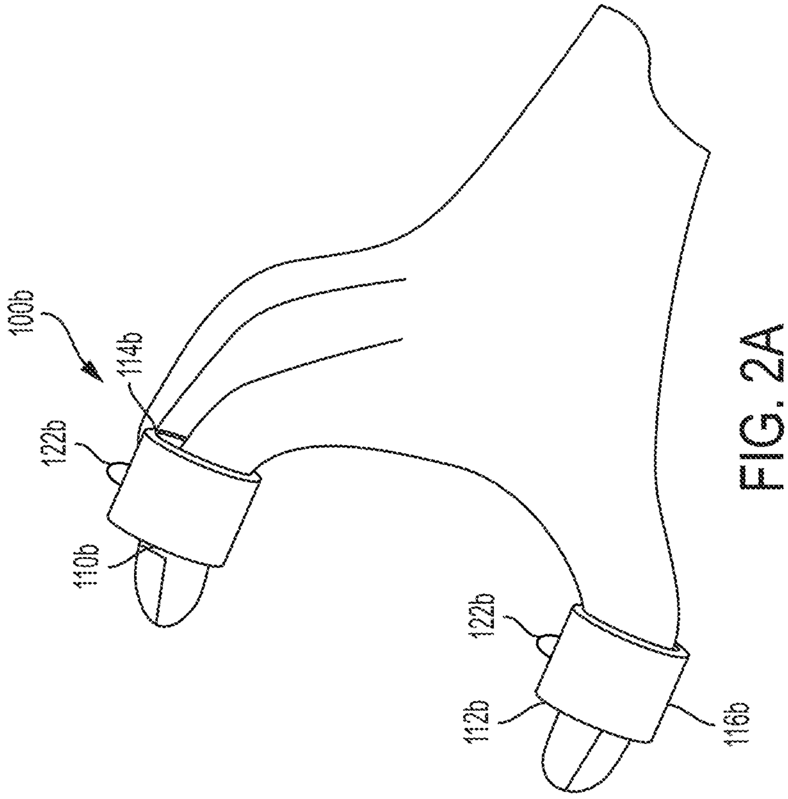
FIG. 2A is a schematic drawing of another exemplary monitoring system including wearable sensor devices worn by an acute care provider, according to an aspect of the present disclosure.
Figure 2B:
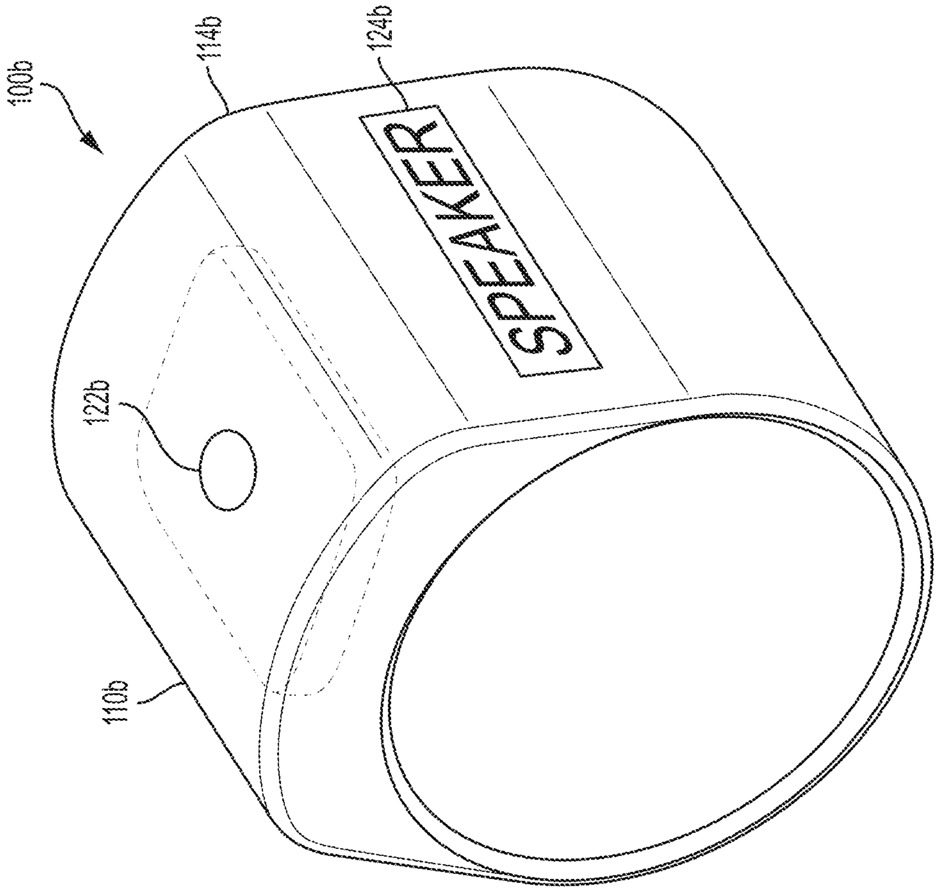
FIG. 2B is a schematic drawing of one of the exemplary wearable sensor devices of the system of FIG. 2A.

With reference to FIGS. 2A and 2B, in another exemplary monitoring system 100*b*, the sensor devices 110*b*, 112*b* are capable of wireless communication either between each other and/or with other processing and feedback devices, such as with a controller device (not shown). For example, the wireless sensor devices 110*b*, 112*b* may comprise a wireless transmitter or transceiver enclosed within the housing 114*b*, 116*b*.

In some examples, processing can be performed on a processor enclosed within one of the sensor device(s) 110*b*, 112*b* to determine changes in distances between the devices 110*b*, 112*b*. In that case, one sensor device (e.g., the first sensor device 110*b*) can be configured to wirelessly receive motion information from the other device (e.g., the second sensor device 112*b*), process the received information to determine changes in distance between the devices 110*b*, 112*b*, and provide feedback to the acute care provider based on comparisons between the determined distance change and predetermined target values. Feedback can be in the form of audio feedback from a speaker 124*b* (shown in FIG. 2B), visual feedback from a visual indicators 122*b* (shown in FIG. 2B), and/or feedback from a haptic feedback component enclosed within the housing 114*b*, 116*b*. In other examples, the wearable sensor devices 110*b*, 112*b* can be configured to wirelessly transmit motion information to an external controller device. The external controller device can be configured to process the received information to determine distance changes. The controller device may also be configured to issue instructions to the wearable device(s) 110*b*, 112*b* for providing feedback to the acute care provider. The controller may be substantially similar to controller device 128 (shown in FIGS. 1A and 1C), except that it is in wireless communication with the sensor device(s) 110*b*, 112*b*.

Figure 3:
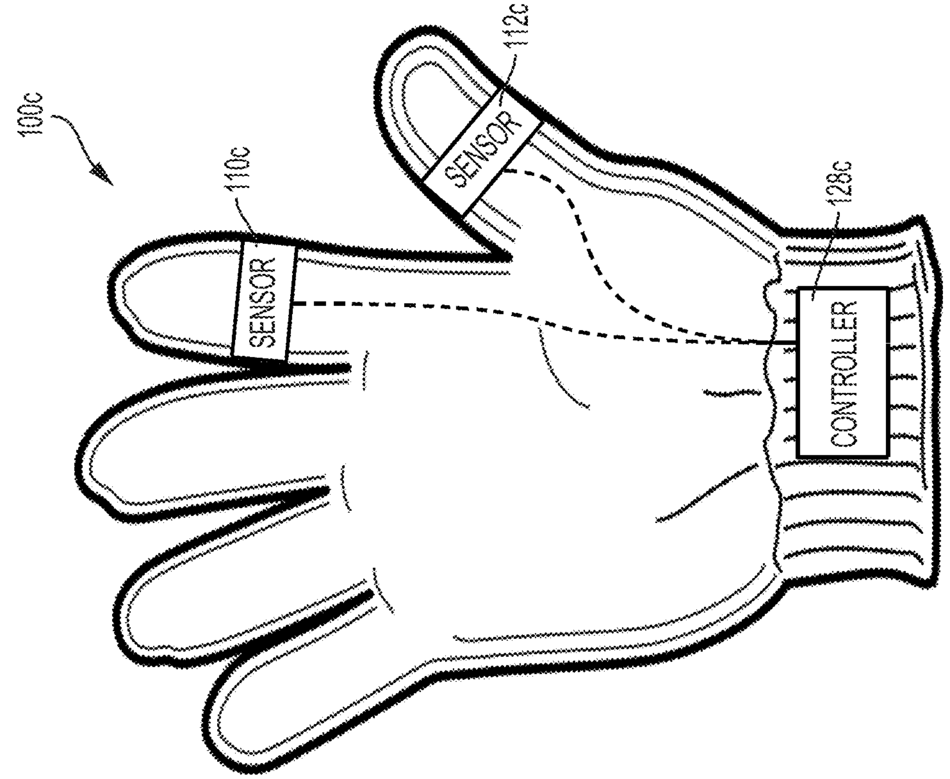
FIG. 3 is a schematic drawing of another exemplary monitoring system including wearable sensor devices and a glove, according to an aspect of the disclosure.

With reference to FIG. 3, in another exemplary monitoring system 100*c*, the sensor device(s) 110*c*, 112*c* can be integrally formed with and/or embedded in another wearable item, such as a glove 132*c* or garment. For example, the glove 132*c* can be a standard wearable glove formed from a suitable comfortable material such as neoprene, Lycra®, elastane, cotton, or polyester. As shown in FIG. 3, the sensor device(s) 110*c*, 112*c* can be positioned at or near finger portions of the glove 132*c*. For example, the first sensor 110*c* can be disposed at the index finger portion 134*c* of the glove 132*c* and the second sensor 112*c* can be disposed at the thumb portion 136*c*. The sensor devices 110*c*, 112*c* can be mounted and/or attached to the glove 132*c* in any number of different ways. For example, the sensor devices 110*c*, 112*c* can be attached to portions of the glove 132*c* by stitching or by an adhesive. In other examples, the sensors 110*c*, 112*c* can be enclosed within the glove 132*c*, such as between an outer layer and an inner layer or lining of the glove 132*c*.

The sensor device(s) 110*c*, 112*c* can be connected to a processing module or device, such as a controller device 128*c*, by a wired or wireless connection. For example, the controller device 128*c* can be positioned in a proximal end 138*c* of the glove 132*c* (e.g., near the acute care provider's wrist) and can be electronically coupled to the first sensor device 110*c* and/or the second sensor device 112*c* by wires 140*c* extending from the finger portions of the glove 132*c* to the controller device 128*c*. In some instances, wires 140*c* can be woven in one of the layers of the glove 132*c* or embedded between the outer layer and lining thereof. In other examples, information can be transmitted wirelessly from sensors 110*c*, 112*c* disposed near the finger portion 134*c* of the glove 132*c* to either the controller device 128*c* or to a remote electronic device.

Figure 4B:
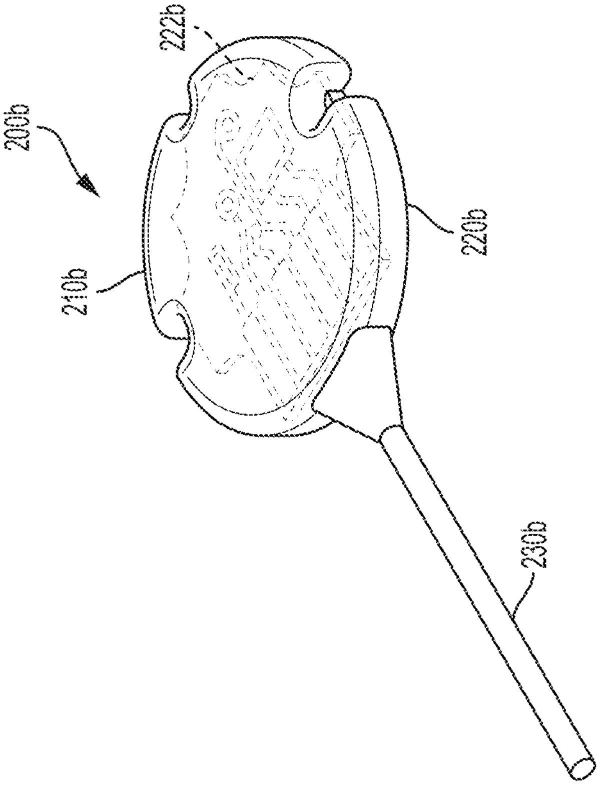
FIGS. 4A and 4B are schematic drawings of an exemplary monitoring system including an exemplary sensor device, according to an aspect of the disclosure.
Figure 4A:
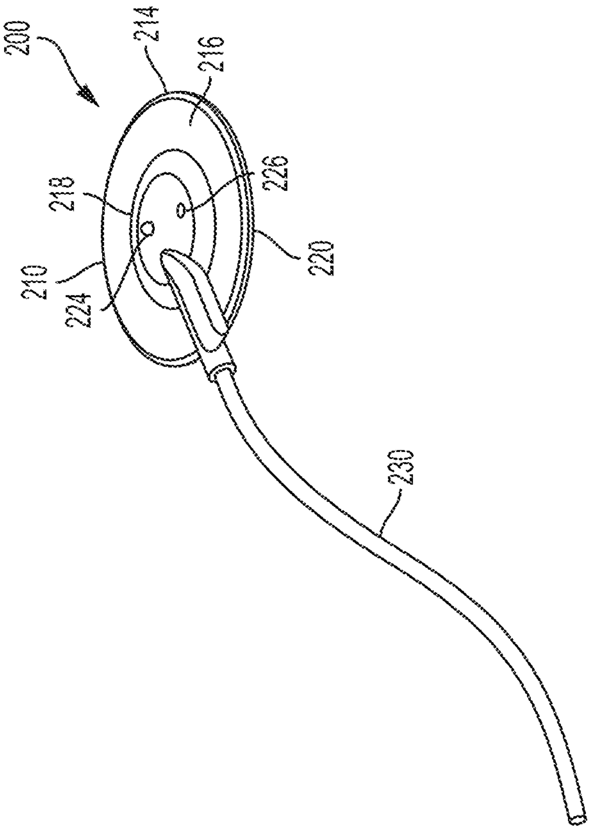

With reference to FIGS. 4A, a wearable sensor device 210 for another exemplary monitoring system 200 is illustrated. The wearable sensor device 210 is capable of being affixed or adhered to portions of the acute care provider's skin or clothing. The wearable sensor device 210 comprises an adhesive substrate 214 comprising a proximal side 216 in contact with a housing 218 of the sensor device 210 and a distal side 220 configured to be adhered to the acute care provider. The substrate 214 may comprise, for example and without limitation, a woven fabric, plastic, or latex strips coated on a distal side 220 thereof with an adhesive. The adhesive can comprise one or more of an acrylate (e.g., methacrylate or epoxy diacrylates), vinyl resins, and similar materials used, for example, for adhering adhesive bandages to skin.

The housing 218 encloses electronic circuitry including components for sensing motion of the acute care provider, processing the received information, and transmitting or communicating the received information to external sources. The electronic circuitry can comprise one or more flexible circuit boards comprising, for example, a processor, motion sensor, output component interface, and communications interface for wired or wireless data communication. The sensor device 210 can be electronically coupled to a cable 230. The cable 230 can connect the sensor devices 210 to other sensor device(s) and/or to a controller device, such as controller device 128 (shown in FIGS. 1A and 1C). Information received and processed by the wearable sensor device 210 can be communicated to the other devices by the cable 230. In other embodiments, the sensor device 210 may be in wireless communication with an appropriate electronic device. In that case, a cable is not required for sending and receiving information there between.

The wearable sensor device 210 can further comprise output components electronically coupled to the output interface for providing feedback to the acute care provider regarding performance of resuscitation activities. For example, the sensor device 210 can include visual indicators 226, speakers 224, and/or haptic output components enclosed within the housing 218.

In some examples, the system 200 comprises multiple adhesive sensor device(s) 210 configured to be adhered to portions of the acute care provider's hands or fingers. For example, a wearable sensor device 210 can be attached to the acute care provider's index finger and/or thumb for sensing movement thereof. In other examples, wearable sensor device(s) 210 can be affixed to portions of the acute care provider's arms or clothing. In still other examples, wearable sensor devices 210 can be adhered to the patient for providing movement information for the patient during performance of resuscitation activities. For example, a wearable sensor device 210 affixed to the patient's sternum may be used to provide movement information about chest compressions performed on the patient. A wearable sensor device 210 affixed to the patient's chest may also provide ventilation information by sensing the rise and fall of the chest during breathing and/or ventilation.

Another embodiment of an exemplary sensor device 210*b* is illustrated in FIG. 4B. The sensor device 210*b* includes electronic circuitry 222*b* enclosed within a housing 218*b*. A distal surface 220*b* of the housing 218*b* can comprise an adhesive for mounting the sensor device 210*b* to the patient. As in the previously described example, the sensor device 210*b* is coupled to a cable 230*b* for establishing communication between the sensor device 210*b* and other sensor devices and/or computing devices for processing information collected by the sensor device 210*b*. Exemplary internal components:

Having described exemplary external features of the sensor device(s) 110, 112 and other components of the exemplary systems 100, 100*b*, 100*c*, 200, 200*b*, exemplary internal components of a monitoring system 100 for monitoring performance of resuscitation activities by an acute care provider will now be described further.

Figure 5:
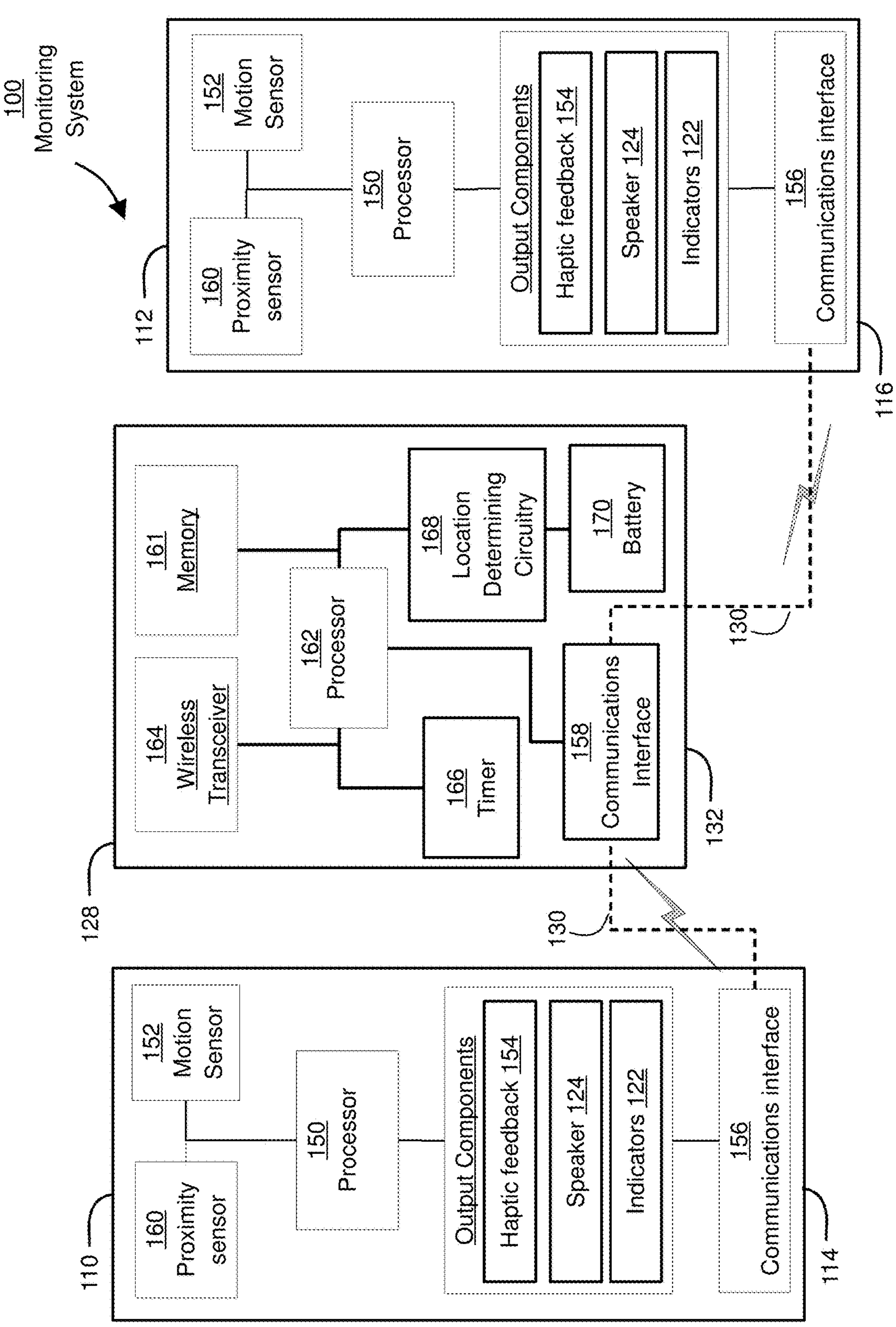
FIG. 5 is a schematic drawing of an exemplary monitoring system, according to an aspect of the disclosure.

As shown in FIG. 5, the sensor device(s) 110, 112 may each comprise a processor 150 coupled to a motion sensor(s) 152 and output components, such as a haptic feedback component 154, visual indicators 122, and/or speaker 124. Alternatively or in addition, the system 100 can comprise earpieces or ear buds (not shown) worn by an acute care provider and in wireless communication with the sensor device(s) 110, 112 and/or controller device 128 for providing audio feedback to the acute care provider. The motion sensor(s) 152 can comprise one or more of an accelerometer (e.g., a single axis accelerometer or a multi-axis accelerometer), velocity sensors, ultrasonic sensors, and infrared sensors, as well as other sensors for measuring proximity or displacement. A single axis accelerometer can be used to determine chest compression parameters by measuring and/or providing signals that assist in determining acceleration, velocity, and/or displacement of the sensor. Multi-axis accelerometers, e.g., a three-axis accelerometer, can provide signals that further determine relative orientation of respective electrode assemblies by measuring parameters indicative of motion along each axis. The motion sensor(s) 152 can further comprise a gyroscope for determining orientation of the sensor device(s) 110, 112 based on detected tilt or rotation.

Output Components

In some examples, the sensor device(s) 110, 112 can be configured to provide information to the acute care provider, such as feedback concerning performance of resuscitation activities, by audio output components, such as the speaker(s) 124. As one example, the sensor device(s) 110, 112 can be configured to emit a sound through the speaker 124 to guide performance of activities that involve repeated performing the same motion in rhythm. For example, the speaker 124 can be a metronome that provides guidance for chest compression or ventilation rate. Sounds emitted from the speakers 124 can also notify the acute care provider of alerts that require the acute care provider's attention. For example, an audio alert could issue at a predetermined time to instruct the wearer to switch places with another acute care provider or to perform another type of resuscitation activity. In some examples, verbal commands can be issued to the acute care provider, such as "Check Pulse," "Give Breath," "Check Pads," or for chest compressions, "Faster," "Fully Release," "Push Harder," "Push Softer," "Good Compressions," and/or "Slower."

Feedback to the acute care provider can also be provided through the haptic feedback component 154. In some examples, the haptic feedback component 154 comprises one or more vibrating motors. For example, the vibrating motor can be a linear actuator disposed on one side of the annular housing. Alternatively, the vibrating motor can be an annular or partially annular vibrating actuator extending through the annular housing 114, 116. Desirably, the vibrating actuator can comprise a compact actuator that provides the ability to adjust the pattern (e.g., frequency, intensity) of vibration/touch feedback. Such an actuator may include a spring and magnet for manipulating a mass coupled thereto. Any suitable actuator may be used, though, in some cases, linear actuators may be advantageous over rotating mass vibration motors in that they typically consume comparatively less energy and exhibit less latency upon actuation In some examples, haptic feedback can refer to mechanical stimulations applied to a user for recreating a sense of touch from forces, vibrations, and/or motion generated by the feedback component 154. Haptic feedback can include varying vibration intensities or patterns to convey different types of information to the acute care provider. In some implementations, haptic feedback provides notifications or alerts for the acute care provider. For example, the sensor device(s) 110, 112 can vibrate when a particular resuscitation activity (e.g., chest compressions) should be performed and/or ceased by an acute care provider.

Haptic feedback from the haptic feedback component 154 can also guide performance of resuscitation activities by the acute care provider and/or provide information to the acute care provider about the quality or accuracy of resuscitation activities being performed. The feedback can be periodic and provided, for example, to instruct an acute care provider to initiate a compression or ventilation. In some examples, haptic feedback is provided both when the acute care provider should begin a compression or ventilation and when the acute care provider should release the compression or ventilation. Accordingly, haptic feedback can be a supplement to or a replacement for the audible metronome emitted from the speakers 124. Advantageously, since the haptic feedback is felt directly at the acute care provider's finger(s), hand and/or wrist, the acute care provider may find it easier to respond to (e.g., keep pace with) haptic feedback as compared to visual or audio feedback, which must be seen or heard to be followed. In some examples, haptic feedback can be provided along with other types of feedback (e.g., audio and/or visual) to convey additional information to the acute care provider. For example, haptic feedback can be provided to instruct the acute care provider when to begin and when to release a compression. Audible feedback can be provided to inform the acute care provider that chest compressions are not being performed in accordance with target values. For example, the speaker 124 can emit an audible instruction for the acute care provider to "Press Harder" or "Speed Up" if compression depth or rate is not within the target range. Or, if chest compressions are within a desired range, the system may inform the user that "Good Compressions" are being provided.

Haptic feedback can also be used to provide information to acute care providers for coordinating activities performed by different acute care providers. For example, a first type of feedback, such as a pulse of visual, audible, or tactile feedback may be provided to guide an acute care provider in performing CPR. The pulse can be interrupted and/or replaced with a different type of feedback, such as constant sound or vibration, to indicate that an acute care provider is to stop performing the resuscitation activity and to let another acute care provider takeover. In a similar manner, where there are three or more acute care providers, the third acute care provider may be resting while resuscitation activities are being performed by the first two acute care providers. When an acute care provider change is needed, the sensor device(s) 110, 112 worn by the third acute care provider can vibrate, indicating that he or she should take over chest compressions or ventilation. In some examples, the output components can instruct the acute care provider about which resuscitation activity to begin performing. In other examples, the monitoring system 100 can be indifferent to the manner in which acute care providers decide to rotate. In that case, the system 100 can be configured to identify the type of resuscitation activity being performed and provide appropriate feedback. Similarly, it is recognized that a rotation can change during a rescue (e.g., an acute care provider may initially provide chest compressions as part of a three-person rotation and may then bow out and just provide ventilation while the other two acute care providers rotate on chest compressions).

In some examples, an amount of information that can provided by haptic feedback can be substantially increased by varying a pattern and/or intensity of vibrations emitted from the sensor device(s) 110, 112. A pattern of haptic feedback can refer to a recognizable repeated sequence of pulsed vibrations of varying duration. In other cases, a pattern of haptic feedback can refer to a repeated sequence of vibrations of varying intensity. For example, the haptic feedback component 154 can be configured to emit a low intensity vibration to encourage the acute care provider to initiate a resuscitation activity and a higher intensity vibration to encourage the acute care provider to cease the resuscitation activity. Accordingly, for an acute care provider providing chest compressions to the patient, the haptic feedback mechanism can provide a low level of vibration instructing the acute care provider to initiate a compression by pushing downward on the patient's chest (for an adult) or moving the finger(s) toward the thumb (for an infant). The low level vibration can continue until a target depth and/or A-P distance change is recorded. Once the target depth and/or A-P distance is reached, the haptic feedback component 154 can emit a higher intensity vibration signaling to the acute care provider that the compression should be released. The higher intensity vibration can continue until the motion sensor 152 senses or determines that the acute care provider releases the compression.

In a similar manner, a low intensity vibration can be provided by the haptic feedback component 154 to instruct an acute care provider to begin compressing a ventilation bag. The low intensity vibration can continue until a target ventilation volume is expelled from the bag. Once the target ventilation volume is expelled, the haptic feedback component 154 can provide a higher intensity vibration to inform the acute care provider to release the bag. Or, in another example, a vibration can start at the moment of detection of the start of a compression/ventilation and not end until the target depth/volume has been achieved.

Communications Interface

With continued reference to FIG. 5, the sensor device(s) 110, 112 may further comprise a communications interface 156 electronically coupled to the processor 150. The communications interface 156 can be configured to provide information sensed by the motion sensor(s) 152 to an external device, such as the controller device 128. For example, the communications interface 156 can be connected to the cable 130 extending between the sensor device(s) 110, 112 and the controller device 128. The communications interface 156 can facilitate transfer of information from the sensor device(s) 110, 112 to and from a corresponding interface of the controller device 128. In other examples, as discussed in connection with FIGS. 2A and 2B, the communications interface 156 can be configured for wireless communication with the controller device 128 and/or with other electronic devices located either on (e.g., worn by or connected to) the acute care provider or to remote electronic devices, such as other medical devices at an emergency scene and/or to a remote computer network.

Proximity Sensor

With continued reference to FIG. 5, the system 100 can further comprise a location and/or proximity sensors, such as a proximity sensor 160 and/or location determining circuitry 168, configured to be worn by the acute care provider for identifying a position of the acute care provider relative to the patient, other medical devices at the emergency scene, and/or other acute care providers at the emergency scene. In some examples, the proximity sensor 160 may be integrally formed with and/or enclosed within the housing 114, 116 of one of the wearable sensor device(s) 110, 112. In other examples, the proximity sensor 160 may be associated with a controller device 128 worn by the patient and/or may be a separate device in wireless communication with the wearable sensor device(s) 110, 112 and/or controller device 128.

The proximity sensor 160 can be configured to detect and identify signals emitted from devices and/or objects at the emergency scene. In some implementations, the proximity sensor 160 can be an antenna or receiver configured to receive and process signals from other devices. For example, electronic medical devices, such as defibrillators, automatic ventilators, patient monitors, bag valve masks, and the like may emit signals that can be detected and identified by the sensor 160. Based on the received signals, the proximity sensor 160 and/or a processor 150 associated therewith can be configured to identify the source of the emitted signal and, in some implementations, determine the acute care provider's distance from the source based, for example, on a quality or intensity of the received signal.

In one example, the proximity sensor 160 comprises a near-field communication sensor configured to detect and identify radio-frequency signals emitted from passive electronic devices located at the emergency scene. For example, passive radio frequency signals can be emitted from radio frequency identification (RFID) tags. RFID tags can be affixed to different objects and items around the emergency scene. For example, RFID tags can be placed on one or more of a ventilation bag, electrode package assembly, defibrillator, or automatic ventilator. Signals emitted from the RFID tags can be received by the sensor 160 and processed to identify items or objects in close proximity to the acute care provider. RFID tags can also be placed on or worn by individuals at the emergency scene including, for example, other acute care providers and/or the patient. Based on signals received from such RFID tags, the system 100 can be configured to determine which acute care providers are nearest to one another and/or which acute care providers are in close proximity to the patient. Additionally, proximity information can be used, for example, to determine which acute care providers are performing which types of resuscitation activities and, in some implementations, to assign certain acute care providers to perform resuscitation activities based on their location. For example, an acute care provider in close proximity to a patient monitor (as determined by a sensed signal from an RFID tag on the patient monitor) may be instructed to review patient vital signs on the monitor. An acute care provider located near the ventilation bag may be instructed to begin performing ventilations. In other examples, RFID tags can be placed on items or tools used by acute care providers during treatment of a patient. For example, RFID tags can be placed on medical vials, syringes, bandage packages, suture kits, and other disposable items used by acute care providers during treatment of a patient. The system 100 can be configured to monitor use of such disposable items based on radio-frequency signals received by the proximity sensors 160 to provide a record of treatments provided to the patient and for inventory purposes.

In certain embodiments, the wearable sensor device(s) may include a proximity and/or force sensor to help identify whether the acute care provider has come off the thorax of the patient. This may be advantageous in cases where there is a tendency for the compression depth to be over-estimated if the acute care provider frequently comes off the chest during decompressions. In some cases, information from an additional sensor, such as a proximity sensor and/or force sensor may be used in combination with information from a motion sensor (e.g., accelerometer) to correct for any such potential inaccuracies.

Controller Device:

With continued reference to FIG. 5, the system 100 can further comprise the controller device 128. The controller device 128 can be a wearable component worn near the acute care provider's hands as shown, for example, in FIG. 1A. In other examples, the controller device 128 can be worn by the patient at another location and can be in wireless communication with the sensor device(s) 110, 112. For example, the controller device can be positioned in the acute care provider's pocket, clipped to a belt, or in another convenient location and in wireless communication with the wearable sensor device(s) 110, 112. In still other examples, the controller device 128 can be a portable, but not wearable, electronic device located at the emergency scene. For example, various computers, tablets, and smart phones can be configured to perform functions of the controller device 128. In still other examples, the controller device 128 can be a part of another medical device, such as a defibrillator or automatic ventilator. For example, a defibrillator or automatic ventilator can be configured to wirelessly receive signals from wearable sensor device(s) 110, 112, process the received information, and provide instructions to the wearable sensor device(s) 110, 112 for providing feedback to the acute care provider. In other examples, the functions of the controller device 128 described herein can be performed by electronic components of one of the wearable sensor device(s) 110, 112 and without the need to transmit data from the sensor device(s) 110, 112 to another device such as the controller.

Communications Interface

In some examples, the controller device 128 comprises a communications interface 158 for wired or wireless communications with the sensor device(s) 110, 112. For example, the communications interface 158 can be configured to receive information from the sensor device(s) 110, 112 through the dongle or cable 130 and to provide the sensed information to a processor 162 associated with the controller device 128 for analysis. The processor 162 can be configured to receive the information from the interface 158 and to analyze the receive information to determine relative motion of and/or changes in distance between the sensor device(s) 110, 112. The processor 162 can further be configured to compare identified motion and/or changes in distance between sensor devices 110, 112 to target parameters to assess quality of resuscitation activities performed by the acute care provider. In some examples, target parameters are stored on computer readable memory 161 associated with and/or electronically coupled to the processor 162. In other examples, target parameters can be obtained from an external source.

Based on signals received from the sensor device(s) 110, 112, the processor 162 can also be configured to confirm that certain treatments have been provided to the patient (e.g., that an injection has been administered at a desired time) and to identify gestures performed by the acute care provider for the purpose of controlling operation of other components of the system 100. For example, the acute care provider could perform a gesture to signify what type of resuscitation activity he or she is performing or will perform (e.g., turning palms downward and mimicking a pushing motion can represent a chest compression, turning fingers or palms upward in a manner that signifies compressing a ventilation bag). Other gestures that can be performed to identify an acute care provider or resuscitation activity can include shaking the index finger or thumb, moving the finger or thumb in a particular gestural pattern (e.g., circular, figure eight, back and forth motion, outlining a recognizable shape pre-input into memory). Such gestural patters can be associated with specific actions (e.g., switching or adjusting the rescue activity, signaling the device to transmit and/or receive information, etc.) acute care providers perform at a rescue scene. For example, an acute care provider can perform a predetermined gesture to identify himself or herself, thereby allowing the sensor device(s) 110, 112 or system 100 to associate sensor device(s) 110, 112 with a particular acute care provider. The use of 3-axis accelerometers help to allow for such determinations to be made. For instance, since most motion during CPR compressions, ventilations, or injections use the sensors in a manner such that motion in one direction (e.g., z-direction) is primarily used, motions recorded in other directions (e.g., x-direction, y-direction) could be used for identification purposes (e.g., identifying the rescuer, activity, etc.).

The controller device 128 can further comprise a wireless transceiver 164 capable of bidirectional communication between the controller device 128 and external sources, such as a computer, database, smartphone, personal data accessory (PDA), remote sensors associated with the patient, and/or with other wearable electronic devices (e.g., computer watches, fitness or activity trackers, etc.). In some examples, the wireless transceiver 164 comprises a short-range data transmitter or transceiver using Bluetooth® or Zigbee protocols. In some examples, the wireless transceiver 164 can be configured to wirelessly communicate with one or more sensing or monitoring devices associated with the patient. Sensing and monitoring devices associated the patient can include, for example, a blood pressure sensor, pulse oximetry sensor, skin or internal body temperature sensor, and others having wireless transceivers for actively or passively transmitting data that can be received by the wearable sensor device 110, 112 and/or controller device 128. Similar sensing and monitoring devices can be provided to assess physical status of the acute care provider to determine, for example, acute care provider fatigue.

In some examples, the wireless transceiver 164 can be configured to transmit data to an intermediate device having long-range data transmission capabilities. The intermediate device (e.g., a smartphone, tablet, laptop computer, or PDA) can receive and, in some cases, perform additional processing on the received data. The data can then be transmitted to an external electronic device, computer network, or database using the long-range data transmission capabilities of the intermediate device. In other examples, the wireless transceiver 164 can comprise circuitry for long-range data transmission directly from the controller device 128 to a remote computer and/or computer network. Long-range data transmission can be performed by a long-range data transmitter or transceiver, for example a Wi-Fi transmitter or a cellular transmitter (e.g., 3G or 4G enabled systems).

Figure 12:
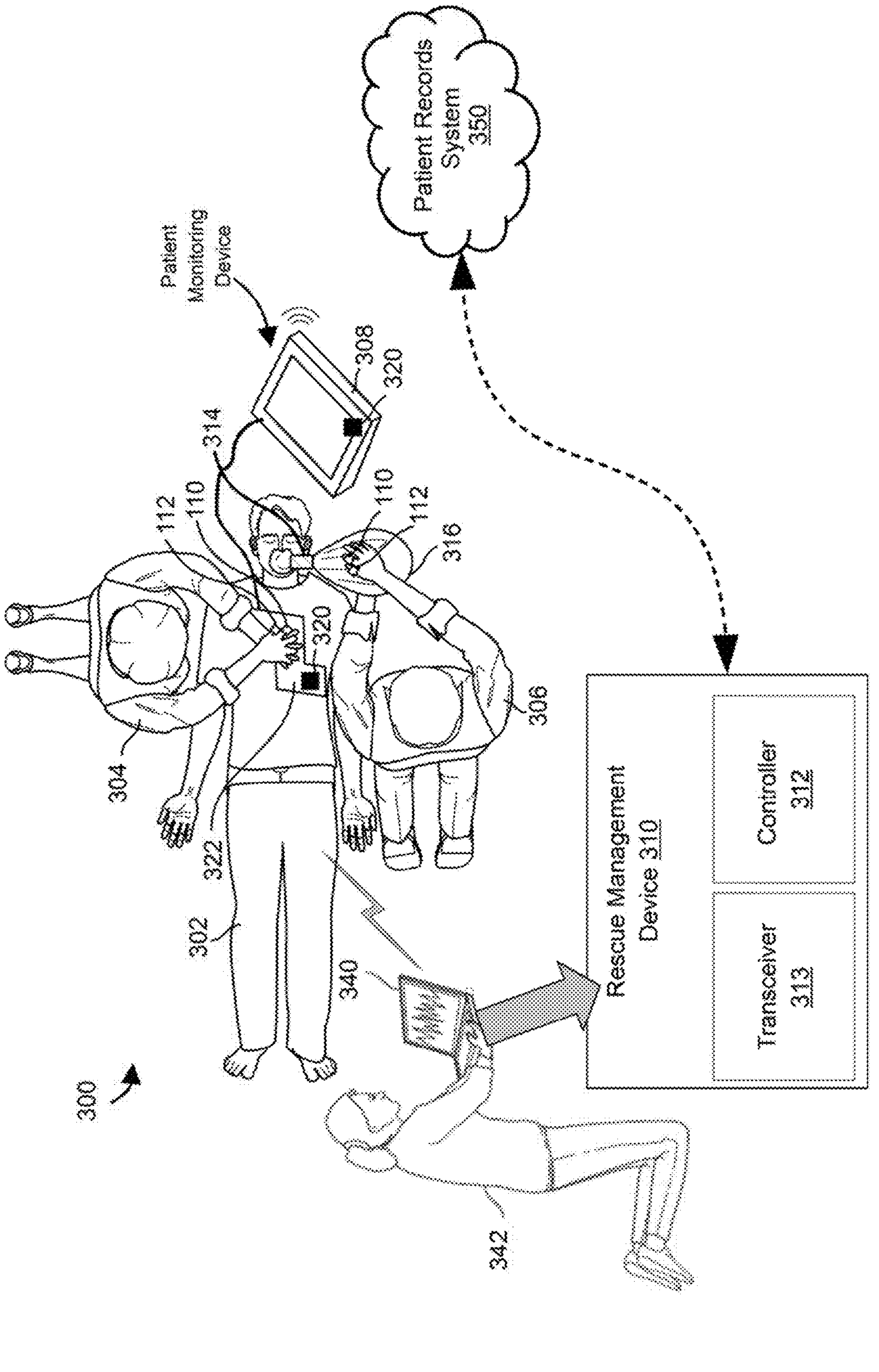
FIG. 12 is a schematic drawing of an exemplary rescue management system used by acute care providers performing CPR on a patient, according to an aspect of the disclosure.

In some examples, the wireless transceiver 164 can be configured to function as a beacon by periodically emitting signals that can be received by other electronic devices (e.g., by the rescue management device 310 or defibrillator 308 shown in FIG. 12) located at the emergency scene or at a remote location. The received signals can be analyzed to determine a quality, intensity, and/or direction from which the signals originated. Based on the analysis, information about the location and/or proximity of acute care provider can be determined.

Timer and Internal Clock

In some examples, the controller device 128 further comprises electronic circuitry, such as an electronic clock or timer 166, for tracking passage of time (e.g., during a resuscitation activity) and/or for determining a current time. The timer 166 can be enclosed within the housing 132 and in communication with the processor 162. The timer 166 can be configured to communicate with an external electronic device, such as a smartphone or PDA, or external computer network to determine a current time. Current time information can be automatically associated with data received from the sensor device(s) 110, 112 to provide a timestamped record of when particular resuscitation activities occur. In some examples, time-stamps can be used to correlate motion sensor information received by the sensor device(s) 110, 112 with data recorded from other medical devices and/or patient monitoring devices at the emergency scene. The time-stamped data can also be correlated with data obtained from sensor device(s) 110, 112 worn by other acute care providers to provide a time-stamped record of multiple resuscitation activities performed for the patient. The timer 166 can also be used to calculate elapsed time since a particular treatment was provided to a patient and, in some cases, to determine when scheduled treatment events should be provided. For example, a treatment protocol may include administering a particular medication to the patient at specific time intervals (e.g., administer an epinephrine injection every 15 minutes). In that case, the timer 166 can automatically track elapsed time since the most recent injection. The output components of the system (e.g., haptic feedback component 154, speaker 124, and/or visual indicators 122) can provide a notification when the next dose should be administered. In another example, the timer 166 can be used to synchronize various resuscitation activities, such as by determining when chest compressions should be paused so that ventilations can be performed.

Location Determining Circuitry

In some examples, the controller device 128 further comprises the location determining circuitry 168, such as global positioning system (GPS) circuitry and/or a cellular transceiver. Information from the cellular transceiver can be used to triangulate device position based on readings from associated stationary access points (e.g., cellular towers). In a similar manner, in some examples, other communications transceivers, such as the network transceiver 164, can be used to identify location information based on known positions of Wi-Fi hotspots or access points. The location information can be used, for example, to determine acute care provider location at the emergency scene and/or to associate particular acute care provider(s) with particular roles or resuscitation activities to be performed. Location information can also be used to determine how close an acute care provider or wearer is to stationary medical equipment such as, for example, a wall-mounted automated defibrillator (AED) or patient monitoring device. In some examples, location information obtained from the location determining circuitry 168 can be stored in device memory (e.g., data storage 161) along with associated timestamps to provide a record of the location of the acute care provider over time.

Battery

With continued reference to FIG. 5, in some examples, the controller device 128 can be powered by a battery 170, located in the housing 132. The battery 170 can be non-removable. In that case, the controller device 128 can be connected to a power source by a power cable, such as a universal serial bus (USB) cord, to recharge the battery 170. In other examples, the battery 170 can be charged wirelessly (e.g., inductively), according to processes known to those of ordinary skill in the art. In other examples, the controller device 128 can be powered by a non-rechargeable battery, such as certain types of lithium button batteries commonly used in watches.

Other Exemplary Systems:

Other systems, such as systems 100*b*, 100*c*, generally include similar electronic circuitry and components as the sensor devices 110, 112 and controller device 128 described in connection with FIG. 5, though arrangement and/or selection of certain components can be modified to address particular needs. For example, for system 100*b* shown in FIGS. 2A and 2B, each sensor 110*b*, 112*b* can comprise an individual data transmitter for wireless communication between the sensors 110*b*, 112*b* and other electronic devices. In some cases, processors on the sensor device(s) 110*b*, 112*b* can analyze the motion information and cause output components to provide feedback to the acute care provider. In that case, only results of analysis, such as information about quality of resuscitation activities performed for the patient may be transmitted from the devices 110, 112 to external sources.

In other examples, the sensor device(s) 110*b*, 112*b* can be in communication with another electronic device, such as a smartphone or personal digital assistance (PDA) device. In that case, the sensor devices 110*b*, 112*b* can be configured to continuously or periodically transmit data (e.g., information from motion sensors) to the smart phone or PDA for processing and analysis. The smart phone or PDA performs many of the functions of the controller device 128 discussed herein in connection FIG. 5. For example, the smart phone or PDA can receive motion information from the sensor device(s) 110, 112 and, based on the received information, determine feedback for the resuscitation activity being performed. Instructions for providing feedback to the acute care provider can be transmitted from the smartphone or PDA to the sensor device(s) 110*b*, 112*b*. The sensor device(s) 110*b*, 112*b* can provide feedback (e.g., visual, audio, or haptic feedback) to the acute care provider based on the received instructions.

Exemplary Resuscitation Activities:

Signals obtained from the motion sensor(s) 152 of the sensor devices 110, 112 are analyzed to identify motion of the acute care provider's fingers and/or hands and, in specific examples, to identify changes in distance between the acute care provider's fingers during performance of resuscitation activities for a patient. Exemplary resuscitation activities that can be monitored with the sensor device(s) 110, 112 described herein include, without limitation, providing chest compressions, providing ventilations using a ventilation bag, and administering an injection using a syringe. Performance of such resuscitation activities by acute care provider's wearing sensor devices 110, 112 will now be further described in connection with FIGS. 6A to 8B.

Figure 6B:
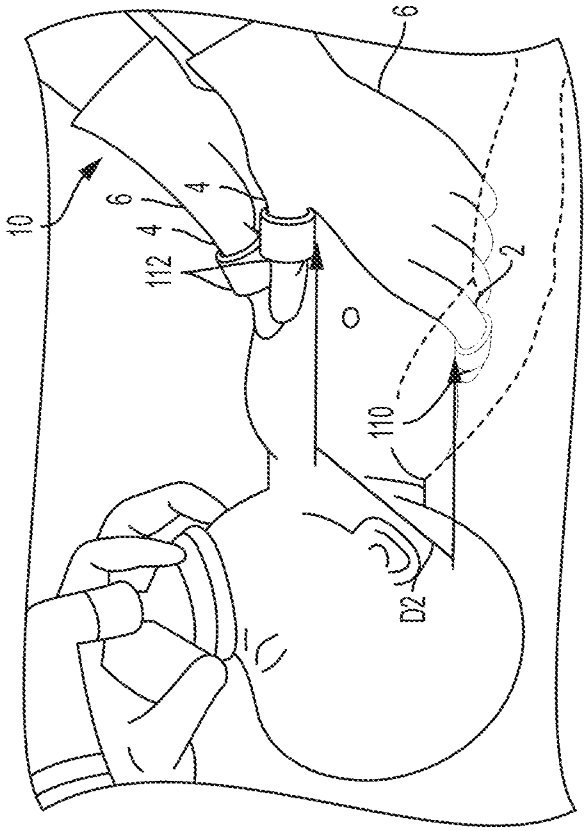
FIG. 6B is a schematic drawing of the acute care provider of FIG. 6A compressing the infant's chest during chest compressions.
Figure 6A:
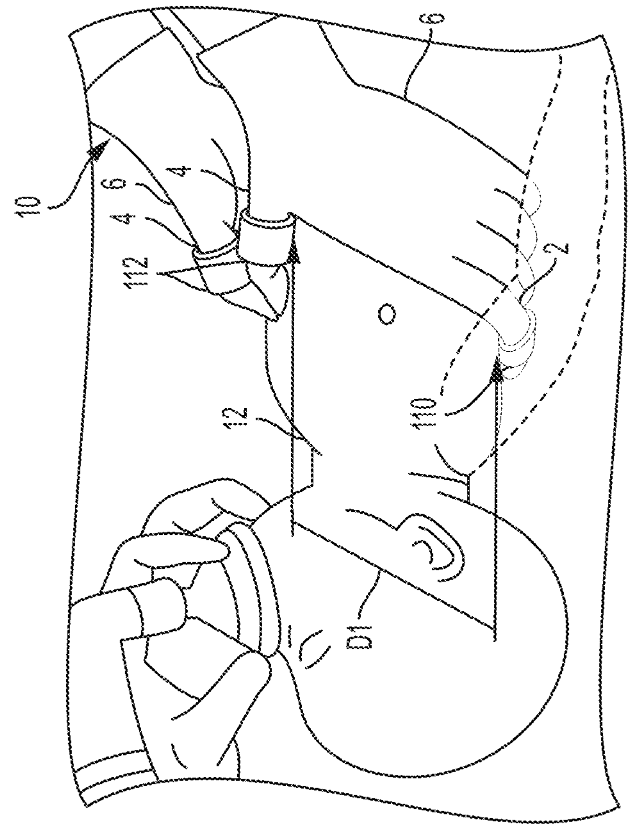
FIG. 6A is a schematic drawing of an acute care provider wearing exemplary wearable sensor devices and performing chest compressions on an infant, according to an aspect of the disclosure.

Infant Chest Compressions:

As shown in FIGS. 6A and 6B, an acute care provider 10 performs chest compressions on an infant 12. The acute care provider 10 is holding the infant 12 in the A-P position, such that thumbs 4 contact the infant's chest and index finger 2 is wrapped around the infant's torso to contact the back. The acute care provider 10 is wearing wearable sensor devices 110, 112 on the index finger 2 and thumb 4 of both hands 6. However, in some examples, an acute care provider may only wear sensor device(s) 110, 112 on one hand 6. For example, an acute care provider may wear sensor device(s) 110, 112 on his or her dominant hand 6 since the dominant hand is more likely to be performing resuscitation activities. Such a technique may be applicable to other patients, such as neonatal patients.

While the chest compressions are being performed, signals received from the sensor device(s) 110, 112 can be used to evaluate motion of an acute care provider's index finger 2 and thumb 4 to monitor and record chest compression parameters, namely chest compression rate and depth (e.g., A-P distance change). As shown in FIG. 6A, in a released position, the acute care provider's hands 6 are relaxed and the infant's chest is fully expanded. The distance between sensor device 110 and sensor device 112 is shown by line D1. During the chest compression, the acute care provider 10 presses down with his or her thumb(s) 4 and in an upward direction with his or her index fingers 2, thereby compressing the infant's chest and reducing the A-P distance between sensor devices 110, 112. In FIG. 6B, the infant's chest is shown in a compressed position. The distance between the sensor device 110 and sensor device 112 is shown by line D2 in FIG. 6B. In some cases, target compression depth and/or A-P distance change for an infant is preferably about 1.5 inches (3.8 cm) (e.g., about one third of the thickness of the thorax, which is about 4.5 inches (11.3 cm)). Accordingly, the change in distance between the released position and compressed position (e.g., D1-D2) should be about 1.5 inches. However, this depth is based on a rough estimate of infant chest thickness which is, of course, variable depending on the age/size of the infant. Indeed, the preferred A-P distance change may be greater or less than 1.5 inches (e.g., may be approximately 0.5-1.5 inches, approximately 0.5-1.0 inch).

In certain embodiments, the wearable sensors devices 110, 112 may be used to estimate the size of the patient. For example, the acute care provider could move his/her hand (with the sensor devices 110, 112 mounted thereon) from one side of the patient to another, such as from the posterior to the anterior, or vice versa. The system may then estimate the A-P diameter of the thorax, and from that estimation, calculate a recommended chest compression depth (e.g., a third of the A-P diameter). In some cases, the acute care provider could press a calibration button on the sensor device 110, 112 or a separate apparatus, so that the system is ready to receive signals that correspond to size calibration. As an alternative example, it may be possible to begin the calibration process by tapping the wearable sensor devices 110, 112 together, indicating that they are directly adjacent to one another, where the tapping signal is determined via a signal spike in the motion sensor (e.g., accelerometer) or audio sensor (e.g., microphone). Once it is determined that the sensor devices 110, 112 are directly adjacent to one another, displacement measured by the sensors may provide absolute measurements of distance. Or, the calibration process may be triggered once the sensor devices 110, 112 are worn, where the absolute separation between the sensor devices 110, 112 may be determined based on changes in the devices relative displacement. Further, short-range communication protocols (e.g., NFC, Bluetooth®, Wi-fi, wireless) may be useable to aid in the calibration process via signal strength measurements. Once A-P diameter of the thorax is estimated, the target chest compression depth may be determined based on the estimated A-P diameter. Accordingly, chest compression feedback may be appropriately provided to the acute care provider.

Motion information from the motion sensors 152 (shown in FIG. 5) of the sensor devices 110, 112 can further be used to determine chest compression rate. For example, motion information from the sensor device(s) 110, 112 can be monitored to identify when the acute care provider's fingers 2 and/or thumb 4 change direction. The change in direction is representative of completion of a chest compression and initiation of a subsequent chest compression. The determination of when a chest compression begins and ends may be used to calculate chest compression rate. For infant chest compressions, a target compression rate is, preferably, about 100 compressions per minute (cpm).

While not expressly shown in the figures, it can be appreciated that other methods of applying chest compressions to an infant and/or neonatal patient may be used. For instance, rather than placing the thumbs on the sternum and opposing finger(s) on the back of the patient, the orientation may be reversed, i.e., the thumb may be placed on the back and the opposing finger(s) placed on the sternum of the patient.

Alternatively, the acute care provider may use one hand to hold the back of the patient and may use the other hand to administer chest compressions. The acute care provider may use his/her index and middle finger to compress the chest while the hand beneath the patient provides a foundational support. Accordingly, the sensor devices 110, 112 may be appropriately placed on the fingers/hand of the acute care provider so as to provide an accurate estimate of chest compression depth and/or rate. For example, sensor device(s) 110, 112 for tracking the posterior surface of the thorax may be positioned on one or more of the fingers that provide a foundational support for the patient. The other sensor device(s) for tracking the anterior surface of the thorax may be positioned on one or more of the fingers that are used to compress the chest of the patient.

The relative position and/or orientation of the sensor devices 110, 112, or changes thereof, may provide an indication to the system of the configuration in which the hands are placed for administering chest compressions. That is, the system may detect when the thumbs and fingers are placed on opposite sides of the thorax, such as that shown in FIGS. 6A and 6B, and estimate chest compression parameters according to this configuration. Or, the system may detect when one hand is placed on the back to support the patient and the other hand is placed on the front of the patient to push the sternum, and estimate chest compression parameters according to this other configuration.

In addition to providing chest compression feedback, information from motion sensors 152 (shown in FIG. 5) can be used to determine other information, such as breaths applied to a patient. As discussed herein, ventilations (manual or automated) can be administered to the patient in between and/or synchronized with chest compressions. The ventilations may cause movement of the patient's body, particularly an identifiable expansion and relaxation of the patient's cardio-thoracic region. Such movements arising due to the ventilations can be detectable by motion sensors 152 of the sensor device(s) 110, 112, provided that the acute care provider's hand(s) 6 are resting against the patient's chest (as shown in FIG. 6A) and that the acute care provider 10 is not actively pressing down on the patient's chest. In that case, motion information from the sensor device(s) 110, 112 can include a waveform (e.g., displacement as a function of time) representative of an undulating back and forth movement of the patient's chest. The frequency of peaks and valleys of the recorded waveform can provide an indication of the rate of ventilations delivered to the patient. Based on the detected ventilation information, an indication and/or feedback (e.g., audio, visual, tactile feedback) as to whether the rate of ventilations should be faster or slower can be provided to the acute care provider touching the patient's chest. In other examples, feedback can be provided to another acute care provider responsible for providing ventilations to the patient based on motion information sensed by sensor device(s) 110, 112 worn by the acute care provider 10 touching the patient's chest, so as to coordinate and/or synchronize chest compressions and ventilations.

Figure 7B:
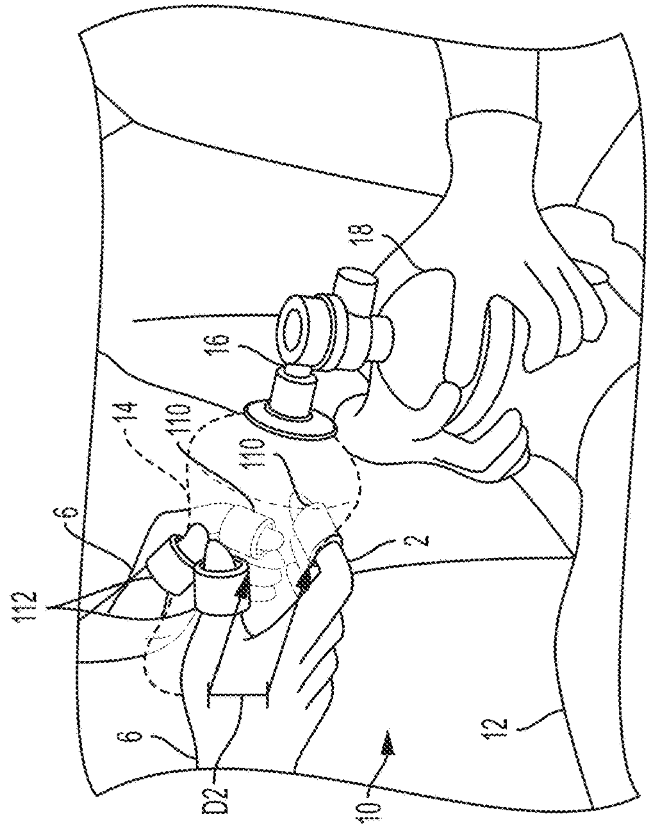
FIG. 7B is a schematic drawing of the acute care provider of FIG. 7A compressing the ventilation bag.
Figure 7A:
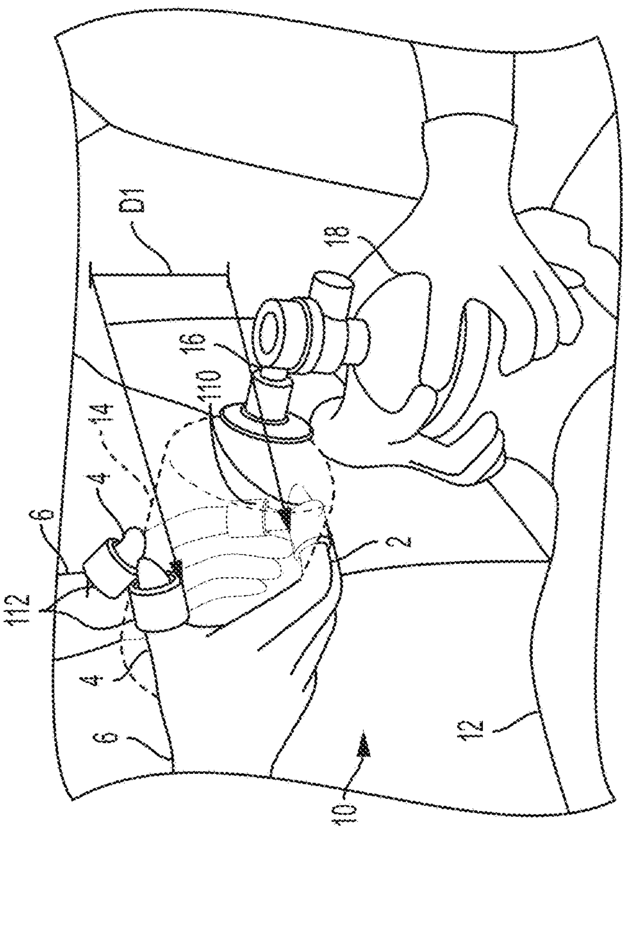
FIG. 7A is a schematic drawing of an acute care provider wearing exemplary wearable sensor devices and performing ventilations with a ventilation bag, according to an aspect of the disclosure.

Exemplary Patient Ventilation Techniques:

With reference to FIGS. 7A and 7B, an acute care provider 10 wearing sensor devices 110, 112 is shown providing ventilations to a patient 12 using a ventilation bag 14. The ventilation bag 14 may include an RFID tag or similar indicator that can be detected by the wearable sensor device(s) 110, 112 to identify that the acute care provider 10 is performing ventilations. Once the type of resuscitation activity being performed is confirmed, motion information received from the sensor device(s) 110, 112 can be used to determine ventilation parameters. While the acute care provider 10 is shown holding the bag 14 with both hands 6, acute care providers 10 often hold and compress a ventilation bag 14 with one hand. In that case, only motion information from the active hand would be used for calculating ventilation parameters. Further, some acute care providers position their hands 6 in other orientations. For example, some acute care providers place one hand 6 on top of the bag 14 and one hand 6 below the bag 14. The ventilation bag 14 is compressed by moving the hands 6 towards one another. In that case, motion information from wearable sensor devices 110, 112 on different hands 6 can be compared to evaluate compression of the bag 14. The system may be configured to determine how the hands are placed for administering ventilations based on the relative position and/or orientation of the sensor devices 110, 112. Changes in the relative position and/or orientation of the sensor devices 110, 112 may also be used by the system to determine how the hands are placed. Once the system determines the placement of the hands, ventilation parameters (e.g., airflow volume, rate) may be estimated.

As shown in FIG. 7A, the acute care provider 10 grasps the bag 14, with the thumb 4 in contact with a top portion of the bag 14. The acute care provider's hands 6 wrap around the bag 14, such that the index finger 2 is in contact with a bottom portion of the bag 14. As shown in FIG. 7A, in an expanded or full position, the acute care provider's hands 6 are relaxed and, while in contact with the bag 14, do not compress the bag 14. The distance between the sensor devices 110, 112 is shown by line D1. As shown in FIG. 7B, in order to provide ventilation to the patient 12, the acute care provider 10 begins to close his or her hands 6 by moving fingers (including index finger 2) toward his or her thumb(s) 4. Accordingly, the distance between the first sensor device 110 and the second sensor device 112 is substantially reduced, thereby compressing the bag 14 to expel air therefrom. The distance between the first sensor device 110 and the second sensor device 112 in the compressed position is shown, in FIG. 7B, by line D2. The air expelled from the bag 14 is provided to the patient 12 through an airflow pathway 16 and a ventilation mask 18.

Information from motion sensors 152 (shown in FIG. 5) of the sensor devices 110, 112 can be used for determining ventilation parameters for the patient including ventilation rate and volume. Rate can be determined, for example, by identifying changes in direction of the acute care provider's hands 6 (e.g., fingers 2 and thumbs 4) while ventilations are being performed. For example, the acute care provider's thumb 4 moves in a downward direction until the bag 14 is compressed a desired amount. Once the bag 14 is compressed the desired amount, the acute care provider 10 slowly releases the bag 14 thereby causing his or her thumb 4 to move in an upward direction until the bag 14 reaches its full or expanded state (as shown in FIG. 7A). Once the bag 14 reaches its full or expanded state, the acute care provider 10 stops moving his or her thumb 4 in the upward direction. A length of time that elapses as the bag 14 is compressed and released is measured. Ventilation rate is based on the measured elapsed time or duration of each ventilation. Ventilation volume can be calculated or estimated based on changes in distance between the sensor devices 110, 112 over the course of a ventilation. For example, changes in distance between the sensor devices (e.g., D1-D2) can be correlated to an air volume expelled from a specific type (e.g., size, shape, manufacturer, and model) of ventilation bag 14.

Controlling ventilation parameters can be especially important when traumatic brain injury (TBI) is suspected or diagnosed. For example TBI can be diagnosed based on patient physiological data and/or by a clinical analysis process. Trends or changes in systolic blood pressure, end tidal carbon dioxide ($ETCO_2$), and blood oxygen saturation ($SPO_2$) should be closely monitored to identify hyper- or hypo-oxygenation in TBI or suspected TBI patients. Hypo-oxygenation can be correlated to increased cranial blood flow, and hyper-oxygenation can reduce cranial blood flow. If a patient has cerebral herniation or impending cerebral herniation, the $ETCO_2$ and/or ventilation rate targets can be changed in order to hyperventilate the patient so as to reduce intracranial pressure. In some examples, treatment protocols can be adjusted to address suspected instances of TBI. Additional examples of processes for modifying resuscitation activities to address TBI are described in United States Patent Application Publication No. 2014/0201627, entitled "EMS Decision Support Interface, Event History, and Related Tools," and United States Patent Application Publication No. 2014/0365175, entitled "Rescue Performance Metrics for CPR and Traumatic Brain Injury," each of which is incorporated by reference herein in its entirety.

Figure 8B:
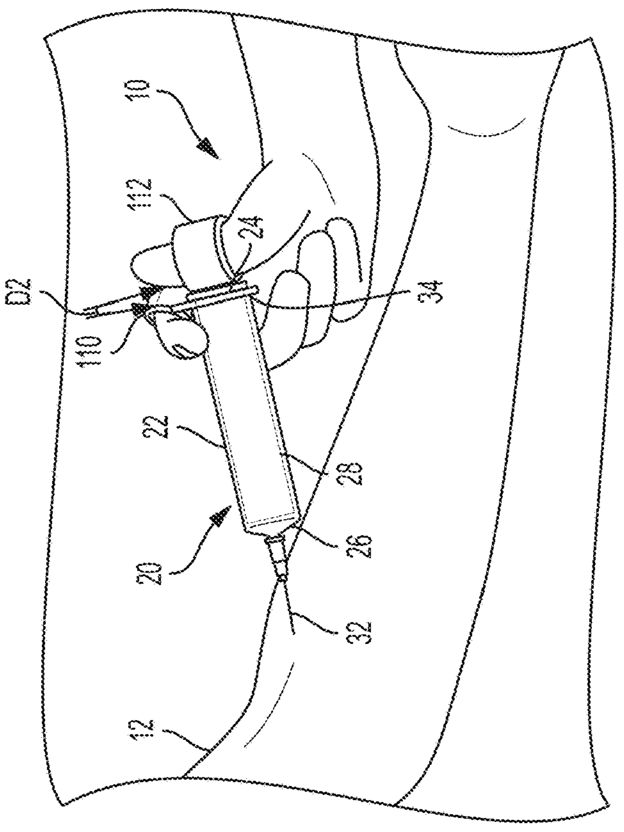
FIG. 8B is a schematic drawing of the acute care provider of FIG. 8A, holding the syringe in an end-of-use position following injection to the patient.
Figure 8A:
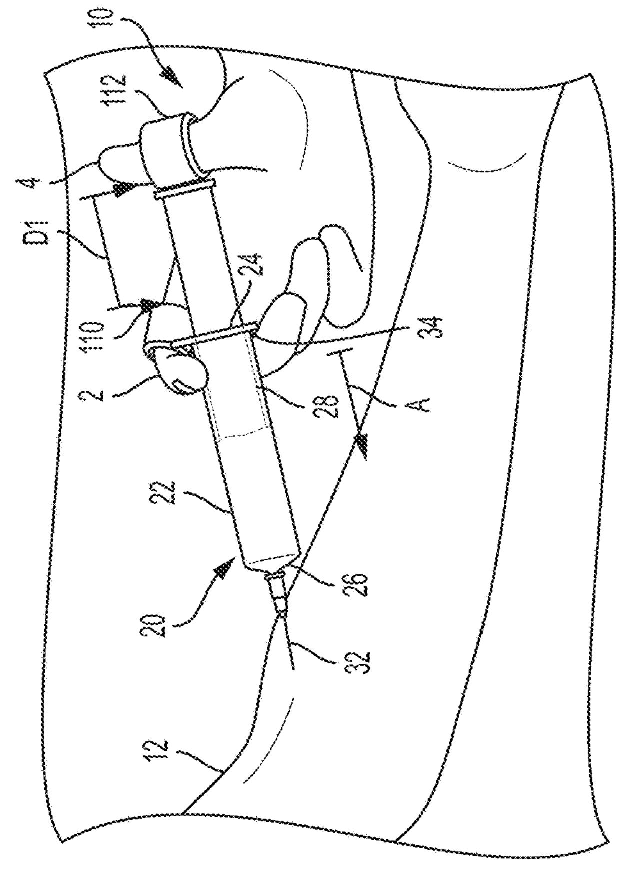
FIG. 8A is a schematic drawing of an acute care provider wearing exemplary wearable sensor devices and administering an injection using a syringe, according to an aspect of the disclosure.

Exemplary Injection Techniques:

As shown in FIGS. 8A and 8B, an acute care provider 10 wearing the sensor devices 110, 112 is shown performing an injection to the patient 12 with a syringe 20. The syringe 20 may include an RFID tag or other indicator that can be detected by the sensor device(s) 110, 112 to identify the type of activity being performed by the acute care provider 10. The syringe 20 comprises a fluid reservoir, such as barrel 22, having an open proximal end 24 and a distal end 26. A plunger rod 28 is inserted into the open proximal end 24 of the syringe barrel 22. The plunger rod 28 is moved through the syringe barrel 22 in a distal direction (as shown by arrow A) to expel fluid therefrom. Fluid is expelled from the syringe barrel 22 through a cannula of a needle 32 mounted to the distal end 26 of the syringe barrel 22.

As shown in FIG. 8A, when the syringe 20 is in a full position, the acute care provider's thumb 4 is placed on a proximal end of the plunger rod 28. The acute care provider's index finger 2 and sensor device 112 attached thereto are positioned adjacent to a flange 34 located at the proximal end 24 of the barrel 22. A distance between the first sensor device 110 and the second sensor device 112 is indicated by line D1 in FIG. 8A. An injection is performed by advancing the plunger rod 28 through the barrel 22 to expel fluid therefrom. In an empty (e.g., fluid expelled) position, as shown in FIG. 8B, the plunger rod 28 is advanced through the barrel 22, such that the acute care provider's thumb 4 (and the sensor device 112) are nearly in contact with the acute care provider's index finger 2 (and the sensor device 110). The distance between the sensor devices 110, 112 in the empty position is indicated by line D2 in FIG. 8B. The change in distance (e.g., D1-D2) between the first sensor device 110 and the second sensor device 112 can be monitored to confirm that an injection has been completed. In some examples, the change in distance between the sensor devices 110, 112 can also be analyzed to determine an amount of fluid injected to the patient. For example, if the total volume of the syringe barrel 22 and/or a volume of fluid contained therein are known, an injection amount can be estimated based on distance traveled by the plunger rod 28. For example, if the sensor devices 110, 112 are in close proximity to one another after performing the injection (as shown in FIG. 8B), it may be assumed that a substantial amount of the fluid contents of the syringe barrel 22 was injected to the patient 12. Or, if the sensor devices 110, 112 are directly adjacent to one another, the system may estimate that the entire fluid contents of the syringe barrel 22 has been emptied. In that case, the injection volume is equal to the syringe barrel 22 fluid volume. However, if the information from the motion sensors of the sensor devices 110, 112 indicates that the plunger rod 28 was only advanced through half of the barrel 22, then it may be estimated that only half of the fluid volume of the barrel 22 was injected to the patient 12. Motion information from the sensor device(s) 110, 112 can also be used to determine injection rate, fluid remaining in the syringe barrel 22 following an injection, and other injection parameters.

The system may be configured to sense the total amount of medicine that has been administered to the patient. This information may be helpful to understand whether the patient is receiving an appropriate amount of medicine. For example, different care providers may be providing care for the patient and might not be aware of all of the interventions that have been applied. Accordingly, the system may be configured to track each care provider and his/her actions to ensure that suitable treatment has been provided. As an example, to ensure that a patient does not receive an excessive amount of medicine, the system may provide an alert or other information so that the user knows that particular amounts of medicines or other interventions have already been administered.

Processes for CPR Feedback and Quality Assessments:

Having described the sensor device(s) 110, 112 and system 100, processes for providing feedback to acute care providers wearing the devices 110, 112 will now be described. For example, methods and processing routines can include receiving information from the wearable sensor device(s) 110, 112 and/or controller device 128, analyzing the received information to determine resuscitation activity parameters, and providing feedback to acute care providers based on determined parameters. The feedback can be substantially real-time feedback for guiding an acute care provider in performance of a resuscitation activity. In other examples, feedback can be provided in the form of a quality assessment provided after treatment of the patient is completed. For example, quality assessment can be provided in the form of an indicator (e.g., a score or metric) related to an overall quality of care provided to a patient at an emergency scene.

Figure 9:
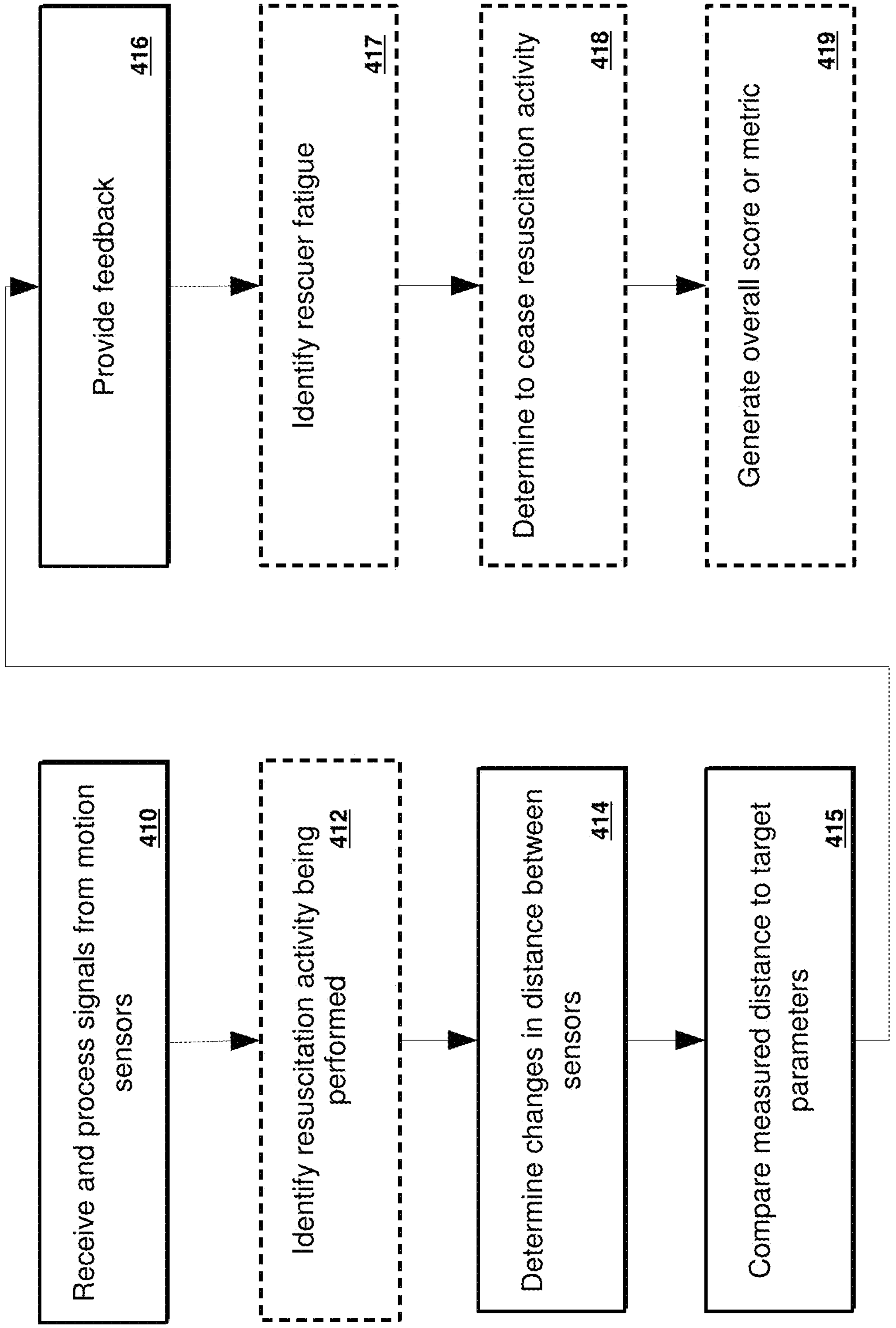
FIG. 9 is a flowchart of an exemplary process for providing feedback about performance of resuscitation activities to an acute care provider wearing wearable sensor device(s), according to an aspect of the disclosure.

CPR Feedback Process:

With reference to FIG. 9, a flowchart for an exemplary process for providing feedback to an acute care provider based on information from the wearable sensor devices 110, 112 is illustrated. The feedback can be provided by one or more of the output components of the sensor device(s) 110, 112. In other examples, the feedback can be provided from other system components, such as the controller device 128 (shown in FIGS. 1A, 1B, and 5), and/or from other electronic or medical devices located at the emergency scene. For example, some types of feedback can be provided by defibrillation or ventilation devices (shown in FIG. 12) at the emergency scene.

As shown at box 410, signals from the motion sensor(s) are received and processed. In some examples, processing is performed by each wearable sensor device. In other examples, information from the motion sensor(s) is provided to the controller device or to another electronic device for processing and analysis. In other examples, processing can be distributed between multiple electronic devices located at the emergency scene. For example, a processor of the wearable sensor device may perform initial processing on received information to prepare motion sensor data to be transmitted (e.g., wired or wirelessly transmitted) to other electronic devices. The other electronic devices can receive the information and perform additional processing routines in order to identify motion (e.g., acceleration and direction) based on received signals.

Optionally, the received and processed signals can be analyzed to determine a type of resuscitation activity being performed by the acute care provider, as shown at box 412. For example, movements of the acute care provider's hands and fingers can be monitored to identify movement patterns representative of specific resuscitation activities. In one example, motion information may be analyzed to determine whether chest compressions are being performed in the A-A position (for an adult, adolescent, child, infant, neonate patient) or in the A-P position (for a neonate, infant, adult, child patient). Specifically, motion information indicating that wearable sensor devices are moving in a coordinated manner in the same direction can indicate A-A position chest compressions. Motion information indicating that sensor devices on the acute care provider's index fingers are moving in the opposite direction from the sensor devices on the acute care provider's thumb may indicate A-P compressions. In a similar manner, orientation information can be considered. For example, in the A-A position sensor devices on the thumb and index finger of one hand may have a same or substantially similar orientation since the acute care provider's fingers and palm are pressed against patient's chest. However, in the A-P position, sensors on the index finger and thumb may have an opposite or substantially opposite orientation (e.g., the index finger sensor device 110 is facing upwards and the thumb sensor device 112 is facing downwards). In other examples, the acute care provider can perform a gesture that can be recognized or detected by the motion sensor(s) to identify and/or confirm a type of resuscitation activity being performed. Or, as discussed previously, the relative orientation or position of the sensor devices 110, 112, or changes thereof, may be indicators of the type of resuscitation activity to be performed.

As described herein, in some examples, the resuscitation activity being performed can be identified based on information received from sensors or input components other than the motion sensor(s). For example, the acute care provider can speak the name of the resuscitation activity being performed (e.g., "Begin chest compressions" or "Begin ventilations"). The speech pattern can be recorded, for example by a microphone associated with the wearable sensor device or controller device, and analyzed to identify the resuscitation activity.

In other examples, information about an acute care provider's relative location and/or proximity to other medical devices or items can be used to determine the resuscitation activity being performed or to be performed by the acute care provider. For example, the proximity sensor may detect or identify signals from RFID tags associated with objects or devices at the emergency scene, such as a ventilator, defibrillator, CPR assistance device, or disposable items, such as a medical vial or syringe. If it is determined that the acute care provider is holding a syringe or medical vial, it may be assumed that the resuscitation activity being performed is an injection. Alternatively, if a signal from an RFID tag associated with a ventilation bag is detected, it may be assumed that the acute care provider is performing ventilations.

In other examples, the resuscitation activity may be known prior to arrival at an emergency scene. For example, prior to starting treatment for the patient, a particular acute care provider may be assigned a specific role or task. In that case, the resuscitation activity to be performed is already known by the system, and no further identification or analysis may be required.

Once the resuscitation activity is identified or confirmed, the received and processed information is analyzed to determine parameters for the resuscitation activity. For example, as shown at box 414, changes in the relative distance between the first sensor device and the second sensor device may be identified. Identification of relative distance change can comprise determining a distance traveled by each sensor device relative to one another based on acceleration (e.g., simultaneous acceleration in the x, y, and z directions). Acceleration in each direction may be double integrated to produce an estimated distance traveled (e.g., depth value). Determination of compression depth by double integration of accelerometer measurements is discussed, for example, in U.S. Pat. No. 9,125,793, entitled "Systems for determining depth of chest compressions during CPR", and U.S. Pat. No. 7,074,199, entitled "CPR chest compression monitor and method of use," each of which is incorporated by reference herein in its entirety. Once distance traveled by each sensor device is determined, a change in distance between the sensor devices, which corresponds to change in A-P distance, is calculated by, for example, subtracting the calculated or estimated distances traveled by each sensor device from an original distance between the wearable sensor device(s). For compressions performed in the A-A position, compression depth corresponds to distance traveled by either of the wearable sensor devices. In that case, measurements from different sensor device(s) can be used to calculate an average distance traveled, to calibrate the respective sensor devices, and/or to determine compression angle.

As shown in box 415, the determined displacement and/or distance changes are compared to target parameter values for the resuscitation activities being performed to assess quality of the resuscitation activities. For chest compressions, target parameters can include compression depth and rate. As described herein, for infant chest compressions, a preferred chest compression depth can be about 1.5 inches (3.8 cm). A target chest compression rate can be, preferably, about 100 cpm. For adolescents and adults, a preferred chest compression depth can be about 2.0 inches, and an appropriate range for chest compression depth can be between about 2.0 inches and 2.4 inches, according to the 2015 Guidelines by the American Heart Association (AHA) for Cardiopulmonary Resuscitation (CPR) and Emergency Cardiovascular Care (ECC). Target chest compression rate according to the AHA Guidelines can be between about 100 compressions per minute (cpm) and 120 cpm, and preferably about 105 cpm. These targets and ranges can vary depending on, for example, patient size and age, acute care provider skill, patient physical status, and other factors.

For ventilation, target parameters can include ventilation rate and volume. Target ventilation rate may be about 10 ventilation breaths per minute (e.g., approximately 30 compressions for every 2 ventilation breaths) for adults and about 20 ventilation breaths per minute (e.g., approximately 15 compressions for every 2 ventilation breaths) for infants. Target parameters can also relate to synchronization or sequences of chest compressions and ventilations. For example, wearable sensor device(s) may direct acute care providers to provide a number of compressions (e.g., about 15 compressions, 30 compressions) and then to pause compressions while delivering a specified number of ventilations (e.g., 2 ventilations).

Target parameters can be stored on memory associates with the wearable device and/or controller device, entered manually by the acute care provider prior to beginning the resuscitation activity, or automatically calculated by the controller device based, for example, on characteristics of the patient or acute care provider. For example, target compression depth can be based on a size or weight of the patient. In other examples, target compression rate and depth can be selected based on skill of the acute care provider. In other examples, target parameters can be received from an external source, such as an external computer or another medical device. For example, the target parameters can be based on a treatment protocol received from another medical device, such as a defibrillator or ventilator, or from a remote computer, computer network, or from a central server.

Based on comparisons of the determined changes in distance and the target values, feedback can be provided to the acute care provider from output components of the sensor device(s) and/or controller device, as shown at box 416. In some examples, feedback comprises indications of when an activity should be performed. For example, feedback can comprise causing the wearable sensor device to emit a vibration or noise when a compression should be started and/or released. In other examples, feedback can include information about whether resuscitation activities are being performed correctly. In that case, the feedback can comprise varying patterns of haptic, audio, or visual feedback. For example, intensity of the haptic feedback can vary based on relative correspondence between the measured values and the target parameter values. Accordingly, in the case of chest compression rate, the haptic feedback component can vibrate with a noticeably higher level of intensity if the rate of compressions being performed is far from the target rate. The intensity of the vibration can decrease as the rate of chest compressions being performed becomes closer to the target rate. In some examples, a particular vibration pattern can be selected to correspond to a particular aspect of the resuscitation activity. For example, the wearable sensor device(s) 110, 112 could vibrate according to a first pattern to inform the acute care provider to initiate a chest compression and, once a target depth is reached, vibrate in another pattern to signal that the acute care provider should release the compression. In other examples, the wearable sensor devices 110, 112 can be configured to provide a low intensity vibration to encourage the acute care provider to begin a chest compression and a higher intensity vibration to encourage the acute care provider to release the chest compression.

As shown at box 417, optionally, acute care provider fatigue can be identified by monitoring changes or trends in the comparison between the determined parameter values and target parameter values over time. For example, if the comparison between measured values for the resuscitation activity being performed and the target parameter values demonstrates a decrease in quality of chest compressions (e.g., a difference between determined values and the target values increases over time), it can indicate that the acute care provider is becoming fatigued. In that case, the device can provide a notification to inform the acute care provider that he or she should switch places with another acute care provider. Exemplary processes for identifying and reporting acute care provider fatigue are disclosed in United States Patent Publication No. 2015/0087919, entitled "Emergency Medical Services Smart Watch," and United States Patent Publication No. 2013/0310718, entitled "CPR Team Performance," each of which is assigned to the assignee of the present application and is incorporated by reference in its entirety.

As shown at box 418, in some examples, the system may be configured to determine an appropriate time to cease performance of the resuscitation activity, and to provide a suitable notification to the acute care provider to that effect. For example, chest compressions could be stopped when a patient ECG signal indicates that normal cardiac function has returned. In other examples, the device can instruct the acute care provider to cease a resuscitation activity if another type of therapy should be provided to the patient instead. For example, the notification can instruct the acute care provider to "Stop Compressions" and "Stand Back" if a defibrillation shock is to be provided to the patient. In some examples, the notification to cease the resuscitation activity can be provided with a different type of feedback from the feedback that guides performance of the resuscitation activity. For example, if feedback guiding performance of chest compressions is haptic feedback, the notification to cease compressions and stand back can be provided by an audible alarm.

Following cessation of the resuscitation activity and/or after treatment of the patient has been completed, acute care providers can be provided with feedback in the form of a metric or score for performance of a resuscitation activity based, at least in part, on motion information collected by the wearable sensor devices. For example, the metric can be in the form of a numeric or letter score representative of quality of treatment provided to the patient. Since an acute care provider may perform a variety of different types of resuscitation activities over the course of an emergency event, the score or metric can be inclusive of quality of different types of resuscitation activities.

For example, as shown at box 419, the system may be configured to calculate the overall score or metric based on the collected motion information. In some examples, a time interval can be selected to limit when performance of the resuscitation activity performance is considered. For example, a pre-selected interval can be used (e.g., an interval of 5 minutes, 15 minutes, or 1 hour). In other examples, the interval can be based on the duration of a normal CPR cycle (e.g., a cycle consisting of 15 compressions followed by two respirations). In that case, a score or metric for each time interval can be calculated. In some examples, a separate score or metric can be calculated for each resuscitation activity performed by the acute care provider at the emergency scene. In addition, a final total or overall score for all resuscitation activities performed during the entire duration of treatment can be calculated. Exemplary algorithms for calculating a score or metric representative of overall quality of CPR based on signals received from motion sensors are described in United States Patent Application Publication No. 2013/0296719, entitled "Rescue Performance Metric", which is assigned to the assignee of the present application, and which is incorporated by reference in its entirety.

The calculated score or metric can be provided to the acute care provider. For example, the score or metric can be shown on a visual display screen of an electronic device, such as a smart phone or computer tablet. In other examples, the score or metric can be given to the acute care provider in the form of a report card provided to each acute care provider at a follow-up meeting or briefing after treatment of the patient is completed. In some examples, the report card can include a score or metric for each resuscitation activity performed by the acute care provider. In addition, the report card can include an individual score for multiple time intervals to illustrate changes in treatment quality over time. The report card can also include a combined or total care metric determined by combining scores for each of the acute care providers that treated the patient. Further, the total care metric can be considered in connection with outcome information related to the physical condition of the patient to provide a correlation between acute care providers, resuscitation activities performed, and effects of the treatment for the patient.

Feedback Based on Acute Care Provider Proximity and/or Location:

In some examples, the system can be configured to identify a resuscitation activity being performed by an acute care provider based on the acute care provider's location and/or proximity to other devices or to the patient. For example, an acute care provider that is located near the patient's torso is likely to be performing chest compressions. An acute care provider sitting or kneeling near the patient's head is likely to be performing ventilations. An acute care provider in close proximity to a medical device, such as a defibrillator, is likely to be setting up the device in order to provide treatment to a patient. Accordingly, in some examples, acute care provider location can be used as a basis for determining types of feedback to provide to the acute care provider. As described herein, feedback can be provided by output components of the wearable sensor devices.

Figure 10:
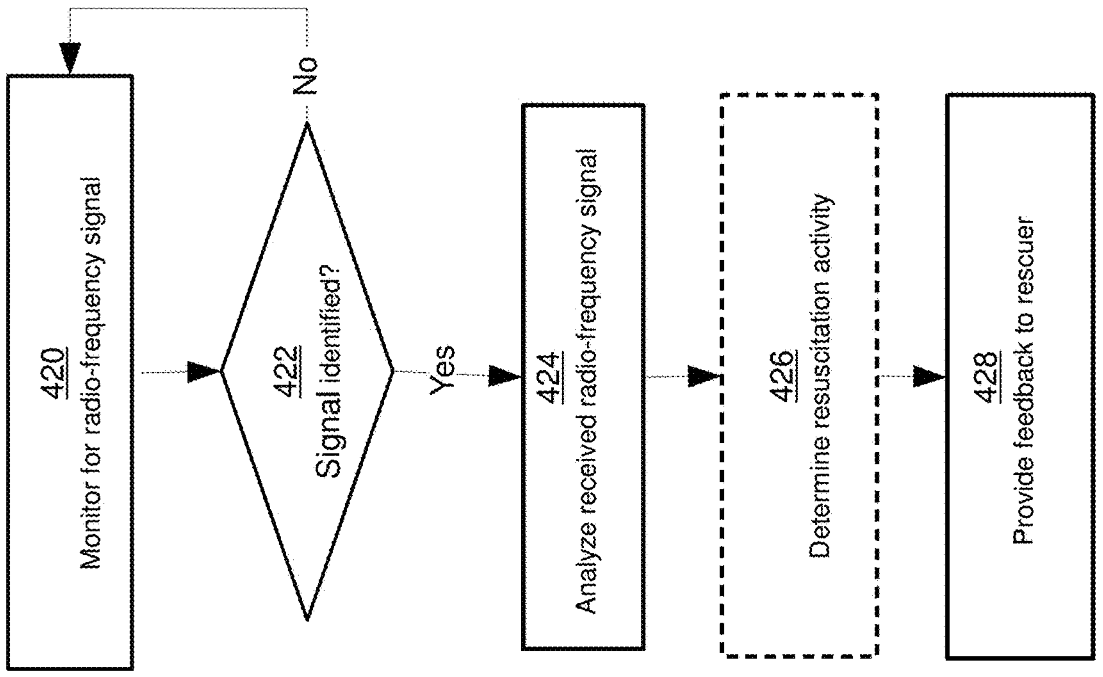
FIG. 10 is a flowchart of an exemplary process for providing feedback to an acute care provider wearing wearable sensor device(s) based on a determination of the acute care provider's location and/or proximity to objects or individuals at an emergency scene, according to an aspect of the disclosure.

With reference to FIG. 10, a flowchart for providing feedback to an acute care provider based on the acute care provider's location and/or proximity to certain objects or individuals is illustrated. In some instances, the acute care provider's location can be determined based on signals received by a proximity sensor, such as a device having near field communication (NFC) hardware. NFC hardware employs a short communication distance (e.g., approximately 4-10 cm) transmitter or transceiver for receiving information from electronic devices located in close proximity to the sensor. Using NFC communication data, a secure communications link can be established between multiple devices. Relative location of the acute care provider may also be determined based on analysis of signals (e.g., signal quality and/or intensity) transmitted from network interface circuitry associated with the wearable sensor devices and/or from the controller device. Information about a respective acute care provider's location can be used to assign particular roles or tasks to particular acute care providers, as well as to determine which resuscitation activities are being performed by respective acute care providers.

As shown at box 420, the wearable sensor device(s) and/or other electronic components of the system can be configured to actively or passively monitor for radio-frequency signals or other electronically transmitted signals emitted from electronic devices or circuitry located at the emergency scene. Radio frequency signals may be emitted by a near-field communication device, such as the RFID tags located on devices and/or tools located in proximity to the acute care provider. In other examples, signals can be received from data transmitters, such as Wi-Fi or Bluetooth® transmitters. Monitoring can be performed continually, on a periodic basis, or in response to a request by a user. For example, the acute care provider may press a button or perform some other action to cause the wearable device to scan for identifiable radio-frequency signals within a predetermined distance. As shown at box 422, monitoring may continue until at least one signal is identified. As shown at box 424, once identified, the signal is analyzed to determine certain information about the signal source. For example, an RFID tag may include information about the item or device to which it is attached. Signals may also be received from electronic devices worn by other acute care providers. Such signals may include information about the resuscitation activity being performed by the other acute care provider or a level of fatigue of the other acute care provider (e.g., whether the acute care provider should switch roles).

As shown at box 426, optionally, information obtained by analysis of received signals can be used to identify the resuscitation activity being performed by the acute care provider. Information about medical items or medical devices near the acute care provider and/or about the acute care provider's proximity to the patient or other acute care providers may be relevant for identifying a particular resuscitation activity being performed. For example, an acute care provider in close proximity to a ventilation bag is likely to be providing ventilations to the patient. Two acute care providers located in close proximity to one another may be working together to perform a task.

As shown at box 428, once the resuscitation activity being performed by the acute care provider is identified, feedback can be provided to the acute care provider including guidance for performing the activity. Exemplary feedback that can be provided by the system and/or wearable devices is described herein, in connection with FIG. 9. For example, calculated changes in distance between wearable sensor devices can be monitored and compared to target parameter values to assess quality of the resuscitation activity being performed. In another example, an acute care provider that is determined to be in close proximity to a medication storage location may be instructed to obtain a syringe and medical vial, and to administer an injection to the patient. In that case, feedback could further comprise instructions for when the injection will need to be performed again and, if so, to provide a notification for the acute care provider when the next injection should be performed.

The acute care provider's location and/or proximity to other medical items and devices may continue to be monitored on a continual or periodic basis during treatment of the patient. If it is determined that the acute care provider has moved to a new location and started to perform a different resuscitation activity, the feedback being provided to the acute care provider can be updated for the new activity. Similarly, if a new medical device is set up near the acute care provider, the feedback can be updated to instruct the acute care provider to begin using the newly available medical devices. For example, when an acute care provider first arrives at an emergency scene, he or she may be instructed to manually check for a patient's pulse at predetermined intervals. Once a patient monitor or defibrillator is set up, the acute care provider may no longer need to periodically check patient vital signs, as such information is being monitored by the monitoring device and/or defibrillator.

Automatic Generation of DTA Markers:

The wearable sensor device(s) and monitoring systems described herein can also be used to assist in creating a time-stamped record of when certain treatments, resuscitation activities, and other events occurred during treatment of the patient. Such time-stamped records can be referred to as diagnostic/therapeutic activity (DTA) markers (which may otherwise be referred to as code markers) for annotating a patient record with information about when certain resuscitation activities or other diagnostic or therapeutic activities were performed. Such markers can be presented in a coordinated manner with certain physiological records, such as an ECG trace, to demonstrate effects of the activities identified by DTA markers on patient condition. DTA markers can also be used to confirm that certain treatments have been provided to the patient and for scheduling or determining when subsequent resuscitation activities should be performed. DTA markers may be useful for post-rescue review to evaluate the overall course of a resuscitation after the fact, particularly in determining the timing of therapeutic interventions administered to the patient.

As discussed herein, acute care may be provided for patients suffering from cardiac arrest. In other examples, acute care may be provided for the emergency situation of treating a patient undergoing a stroke. In such a situation, in the pre-hospital emergency setting, the acute care provider will make an assessment of the patient using a Stroke Assessment Tool, such as the Cincinnati Prehospital Stroke Scale, the Los Angeles Prehospital Stroke Screen as provided in FIG. 14, or the Miami Emergency Neurological Deficit Scale. DTA markers for each of the questions in the assessment tool (e.g., the Los Angeles Prehospital Stroke Screen shown in FIG. 14) can be sequenced for input with the wearable sensor device(s). In another example, the emergency situation may be for dyspnea, where the DTA markers also include interventions like delivery of a diuretic for a diagnosis of heart failure, or a steroidal inhaler for asthma.

Further exemplary DTA markers can include, for example, CPR, Intubate, Airway (clear airway), CPAP (apply continuous positive airway pressure), IV (intravenous medication), 10 (intraosseous infusion), Nebulize, Cooling, Sedate, Event, Epi (e.g., administration of epinephrine), Atrop (administration of atropine), Dopa (administration of dopamine), Valium (administration of valium), Phen, Bicarb (administration of sodium bicarbonate), Analges (administration of an analgesic), RSI (rapid sequence intubation), Aspirin, Oxygen, Morphine, B-block (administration of a beta blocker), Lido (administration of lidocaine), Mag Sulf (administration of magnesium sulfate), Thrombo (administration of a thrombolytic), Sedation (administration of a sedative), Heparin (administration of heparin), Procain (administration of procaine), Amio (administration of amiodarone), Amiodar, Gluca (administration of glucagon), Thiamine, Dilantin, Narcan, Atrovent, Adenosine, Fentanyl, Digoxin, Vasopr (administration of vasopressin), Dextrose, Paralytic, Nitro (administration of nitroglycerin), Ca Block, Etomidate, Ativan, Glucose, Albuterol, Amrinon (administration of amrinone), Benadryl, Demerol, Oral Glu (administration of oral glucose), Lasix (administration of furosemide), Calcium, Versed (administration of midazolam), Steroid, and Bolus.

Presently, DTA markers are often identified manually by the acute care provider. In some examples, an acute care provider may simply write down what time a task was performed and, in some cases, what time to perform the task again. For example, an acute care provider may be responsible for administering an epinephrine injection at predetermined intervals during treatment of the patient (e.g., every 15 minutes or every 30 minutes). Each time that the acute care provider administers epinephrine, he or she may write down a time that the next injection should be performed. In other examples, an acute care provider may manually identify a DTA marker using electronic devices at the emergency scene. For example, the acute care provider can press a button on a defibrillator, ventilator, or patient monitor to record that a particular treatment and/or resuscitation activity was performed. In other examples, devices that record acute care provider speech can be used by acute care providers to identify code markers (e.g., an acute care provider can speak the phrase "Epi" to signify that he or she administers an epinephrine injection to the patient). The spoken phrase can be identified by the electronic device, and a time-stamped electronic record of the code marker can be stored on computer readable memory associated with the device. Or, one or more gestural motions may be used as identifiers for the system to record a DTA marker. As an example, a gestural motion detected by the wearable sensor device(s) may signify various conditions of the patient (e.g., ROSC, ventricular fibrillation, pulseless electrical activity, etc.) or whether a particular intervention is being applied (e.g., chest compressions, ventilations, drug injection, etc.).

The wearable sensor device(s) and monitoring systems described herein may be configured to automatically identify DTA markers based on acute care provider motion without requiring active confirmation by the acute care provider. Active confirmation can refer to activities that are not integral to patient treatment, and are performed for purposes of identifying DTA markers, such as pressing a button on a medical device or writing down times. Accordingly, the wearable sensor device(s) and system described herein are capable of providing a more accurate record of patient treatment than if such DTA markers were actively recorded (e.g., input manually by acute care providers).

Figure 11:
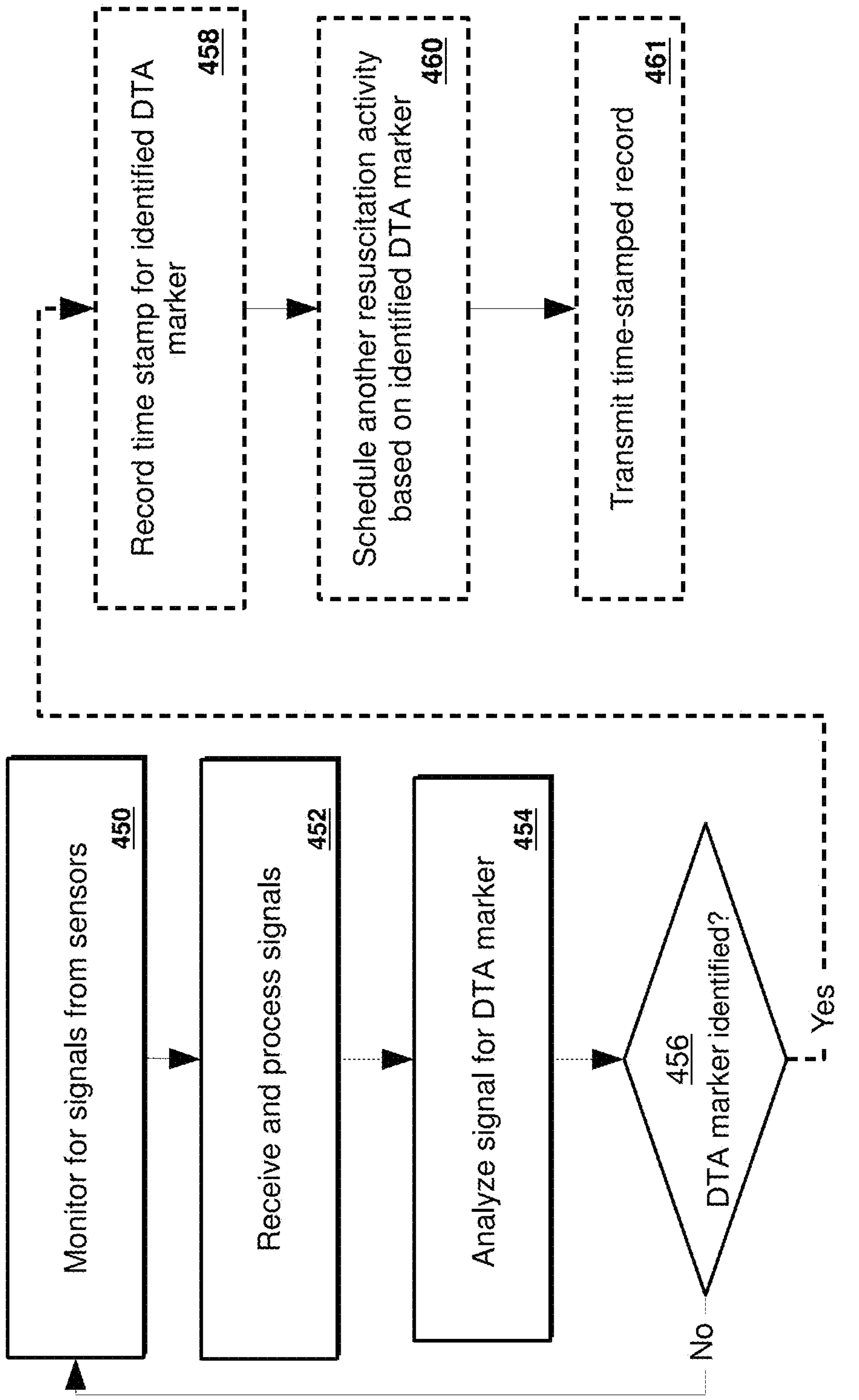
FIG. 11 is a flowchart of an exemplary process for creating a time-stamped record of a resuscitation activity performed during treatment of a patient, according to an aspect of the disclosure.

With reference to FIG. 11, a flowchart showing a process for automatically generating a time-stamped record of DTA markers is illustrated. As shown at box 450, signals from the motion sensors and other sensors of the wearable sensor device(s) are monitored. When a signal is identified, as shown at box 452, the signals can be received and processed by a processor of the wearable sensor device(s) and/or controller device. The received and processed signals are analyzed, as shown in box 454, to detect motion patterns representative of particular DTA markers. For example, identification of motion related to holding and injecting fluid from a syringe may be used as a basis for generating a DTA marker that an injection was administered to the patient. Specifically, the system could be configured to monitor motion-based signals from the wearable sensor devices to determine whether the index finger and thumb are in close proximity (as shown in FIG. 8B). An indication that the index finger and thumb are directly adjacent to one another can be viewed as a confirmation that fluid has been fully ejected from the syringe. In a similar manner, information about the type of therapeutic agent injected to the patient may be identified based on signals received from an RFID tag associated with the syringe and/or medical vial. For example, the RFID tag may identify the type of fluid and fluid volume of the syringe.

As shown at box 458, optionally, a time-stamped record can be determined and collected for each identified code marker. The time-stamped record allows reviewers to consider DTA markers in chronological order and, in some cases, to evaluate effects of different treatments on the condition of the patient. Other information obtained about the patient (e.g., recorded ECG data or sensor data from other sources) can be correlated with received time-stamped record of DTA markers to provide a more sophisticated representation of treatments provided and patient condition over the course of an emergency event.

In addition to generating a time-stamped record of an identified DTA marker, as shown at box 460, the system can be configured to schedule a time for performing a follow-up treatment or resuscitation activity based, at least in part, on which DTA marker was identified. For example, determining or recognizing that the acute care provider has performed an activity that generated a DTA marker can cause the device to update or modify a treatment protocol for the patient to include additional resuscitation activities or events. In one example, as described herein, when the system identifies a DTA marker that an epinephrine injection has been administered to the patient, the device or system may automatically schedule additional epinephrine injections based on when the first epinephrine injection was performed. Accordingly, when the epinephrine DTA marker is identified, the system can automatically initiate a timer or stopwatch to count down until the next injection should be administered to the patient. After the predetermined time, the system can be configured to provide a notification to the acute care provider that another epinephrine injection should be provided to the patient. In this way, providing a DTA marker both provides a time-stamped record of when a resuscitation activity is performed and updates a treatment protocol for the patient to include additional resuscitation activities. In a similar manner, identification of a DTA marker can cause the system or device to automatically update the treatment protocol and/or entries of a checklist of scheduled resuscitation activities to include new or related activities. For example, when a DTA marker for administering epinephrine is received, the system can automatically schedule other activities such as checking patient vital signs (e.g., heart rate, oxygen perfusion, etc.) to confirm that the epinephrine injection is effective.

As shown at box 461, after DTA markers are identified and the treatment protocol is updated, the system can be configured to transmit a time-stamped record of DTA markers and/or resuscitation activities identified during treatment of a patient to an external source. The time-stamped record can include, for example, data representative of when notifications were provided, when confirmations that resuscitation activities were performed were received, and when and what DTA markers were identified. The time-stamped record can be sent, for example, to a central patient monitoring facility or data storage facility, where it can be added to a patient's electronic health record. In other examples, the time-stamped record can be forwarded to other medical personnel, such as to a physician responsible for treating the patient at a hospital or other medical facility. The time-stamped record can be sent to the external source as a batch download once treatment of the patient has been completed or, for example, when the patient is transferred from the acute care providers to a hospital or medical facility. In other examples, the time-stamped record can be sent from the wearable sensor or controller devices to the external source at predetermined intervals during treatment of the patient. For example, a time-stamped record of DTA markers can be uploaded to an external device according to a predetermined schedule, (e.g., once every 5 minutes, 10 minutes, or 30 minutes).

Exemplary Rescue Management System:

Having described the sensor devices 110, 112 and monitoring system 100, an exemplary rescue management system 300 for use at an emergency scene during treatment of a patient 302 will now be described. With reference to FIG. 12, the rescue management system 300 comprises a rescue management device 310 configured to coordinate or direct activities of multiple acute care providers wearing respective wearable sensor devices 110, 112. For example, the rescue management device 310 can be configured to receive information from wearable sensor device(s) 110, 112 worn by different acute care providers to determine a status of each of the acute care providers at an emergency scene and to provide information to specific acute care providers about resuscitation activities to be performed. The rescue management device 310 can also be configured to coordinate patient care during transport of the patient 302 from the emergency scene to a hospital or medical facility and, in some implementations, can coordinate passage of patient information from the rescue management system 300 to corresponding patient and records systems (e.g., a patient records system 350) of the hospital or medical facility. The system 300 can further comprise one or more NFC communication devices 320 (e.g., RFID tags) positioned on devices, objects, and/or individuals at the emergency scene. For example, NFC devices 320 can be positioned on defibrillators 308 ventilation devices (e.g., ventilation bag 316), and electrode assemblies 322. As described herein, radio-frequency signals emitted from the NFC devices 320 can be identified by wearable sensor devices 110, 112. Signals received from NFC devices 320 can be used to determine the acute care provider's location relative to other individuals or devices at an emergency scene. In some cases, the system may be able to identify when a patient is packaged for transport, for example, by sensing substantial movements of the patient, defibrillator, and/or clinician indicative of transport, or by sensing whether devices and the sensors are moving together (e.g., via NFC, reference sensing, etc.) The received signals can also be used for identifying certain resuscitation activities performed by acute care providers.

Rescue Management Device:

The rescue management device 310 is configured to be in wireless communication with each of the wearable sensor device(s) 110, 112 and, in some cases, with other electronic devices at the emergency scene. The rescue management device 310 can be a computer device, such as a desktop computer, laptop computer, defibrillator, monitor, tablet PC, smartphone, and/or PDA comprising a processor or controller 312 in communication with a wireless transceiver 313 configured for bidirectional communication with the wearable sensor device(s) 110, 112. In other examples, the rescue management device 310 can be integrated with and/or physically connected to other medical devices at an emergency scene. Alternatively, the rescue management device 310 can be remote from the emergency scene. In that case, the transceiver 313 of the rescue management device 310 can comprise circuitry for long-range data communication to interact with and/or to receive signals from the wearable sensor device(s) 110, 112. In some examples, the wearable sensor device(s) 110, 112 or controller device 128 (shown in FIGS. 1A, 1B, and 5) may directly transmit signals to and receive signals from a remote rescue management device 310. In other examples, data transmission from the wearable sensor device(s) 110, 112 to remote computerized devices can be performed through one or more intermediate devices, such as smartphones, defibrillator, monitor, tablet PCs, computers, wireless routers, and/or wireless communications gateways at the emergency scene.

In some examples, the controller 312 of the rescue management device 310 is configured to execute software including instructions for managing aspects of patient care at the emergency scene. For example, the controller 312 can be configured to associate each of the wearable sensor device(s) 110, 112 with a respective acute care provider, and, in some instances, each identified acute care provider with a respective role to be performed. In some examples, associating a wearable sensor device 110, 112 with a respective role comprises identifying a resuscitation activity being performed or selected by a respective acute care provider (e.g., based on a gesture performed by the acute care provider). In other examples, associating a wearable sensor device 110, 112 with a respective role comprises automatically selecting a role for an acute care provider based, for example, on the acute care provider's location or proximity to the patient, physical characteristics, experience, or level of fatigue. In some examples, roles can be assigned randomly.

The controller 312 of the rescue management device 310 can also be configured to transmit information related to performance of the assigned or selected role to the wearable sensor device(s) 110, 112 of each respective acute care provider. For example, a signal transmitted from the rescue management device 310 can cause a wearable device 110, 112 to provide a notification to the wearer to begin performing certain assigned resuscitation activities. Exemplary notifications can comprise audio instructions to begin an assigned role, such as "Begin Chest Compressions" or "Set up the Defibrillator."

Acute Care Provider Activities:

With continued reference to FIG. 12, acute care providers 304, 306 are shown performing CPR (e.g., chest compression and ventilation) for a patient 302. Acute care provider 304 performs chest compressions in the A-A position by kneeling adjacent to the patient's torso and bending forward to repeatedly apply pressure to and release the patient's chest. While the patient 302 shown in FIG. 12 is an adult, it is understood that the sensor device(s) 110, 112 described herein, can also be used to monitor performance of resuscitation activities, such as chest compressions, for neonate or infant patients as shown, for example, in FIGS. 7A and 7B.

Acute care provider 306 is providing ventilation to the patient using the ventilation bag 316. As described in connection with FIGS. 7A and 7B, the acute care provider 306 compresses the bag 316 to expel air therefrom. Motion information from wearable sensor device(s) 110, 112, can be used to determine ventilation volume and rate. In some examples, ventilation parameter information can also be provided by a flow sensor 314 positioned, for example, on a breathing tube extending from the bag 316 to the patient 302. The flow sensor 314 can be a pneumatic flow sensor comprising a tube having an airway restriction and pressure sensors for measuring changes in airway pressure caused by the airway restriction. The flow sensor 314 can comprise communications circuitry for wired or wireless communication with other electronic devices, such as associated wearable sensor devices 110, 112 and/or with other electrical devices of the system 300.

Measurements obtained from the flow sensor 314 can be used to guide administration of mechanical ventilation to the patient by, for example, helping the acute care provider 306 to control ventilation volume and/or rate. In particular, if either ventilation volume or rate exceeds predetermined threshold values, the system 300 can cause an alert to be provided to the acute care provider 306. The alert can be wirelessly transmitted to the wearable sensor device 110, 112 worn by the acute care provider 306, and can be provided by haptic and/or audio feedback components of the wearable sensor device 110, 112. In some implementations, the alert can, for example, instruct the acute care provider 306 to modify ventilation volume and/or compression force to adjust output of the ventilation bag 316 for the purpose of modifying flow rate. In other examples, the ventilation bag 316 can further comprise one or more sensors for measuring ventilation parameters comprising, for example, inhaled oxygen concentration, and exhaled $CO_2$ concentration ($ETCO_2$) of the patient. The ventilation sensors may be in wireless communication with the wearable sensor device(s) 110, 112 and/or other components of the rescue management system 300 for informing acute care providers about ventilation status.

A third acute care provider 342 is shown using a portable computing device 340 (e.g., a laptop computer). The portable computing device 340 can be used, for example, to review information collected by patient sensors and monitoring devices at the emergency scene, to control operation of medical devices (e.g., a defibrillator 308 or mechanical ventilator (not shown)), and/or to review other relevant information including, for example, a checklist of interventions, treatment protocols, and equipment to be set up. In some examples, the portable computing device 340 can also be used to wirelessly transmit patient information, such as physiological information measured by patient sensors and monitoring devices, to the patient records system 350. The portable computer 340 can be configured to perform functions of the rescue management device 310 such as, for example, receiving information from the wearable sensor devices 110, 112 and sending instructions to the devices 110, 112 to provide feedback to the acute care provider. In other examples, the portable computer 340 can be an intermediate device that transmits date between the sensors 110, 112 and rescue management device 310.

The portable computing device 340 can be configured to provide more detailed information about the patient and/or emergency scene to the acute care provider 342 than can be provided by output components of the wearable sensor device(s) 110, 112. For example, the portable computing device 340 can be configured to display physiological information about the patient received from a defibrillator 308 or from sensors associated the ventilation bag 316. In some examples, the portable computing device 340 can display information related to ongoing treatment of the patient. For example, a list of roles or resuscitation activities being performed by each of the acute care providers at the emergency scene, received from the rescue management device 310, can be displayed by the portable computing device 340. Similarly, a treatment protocol for the patient and/or a schedule of how and when acute care providers 304, 306, 342 will switch roles could be displayed. In that case, the portable computing device 340 may be used, for example, by a team leader or emergency scene coordinator to assist in coordinating activities of the multiple acute care providers. For example, the team leader or site coordinator may review the more detailed information displayed on the portable computing device 340 to assist in making decisions about the overall condition of the patient and about whether treatment protocols should be updated.

In some examples, another acute care provider (not shown) can be responsible for setting up a therapeutic medical device, such as the defibrillator 308 or a mechanical ventilator (not shown), and/or administering therapeutic agents to the patient at predetermined intervals. Another acute care provider can also be responsible for monitoring patient vital signs as the first two acute care providers 304, 306 provide CPR. In other examples, another acute care provider can be instructed to rest for a predetermined period of time. After the predetermined period of time elapses, the rescue management device 310 can instruct the resting acute care provider to switch roles with one of the active acute care providers 304, 306.

Exemplary Defibrillator:

With continued reference to FIG. 12, the system 300 may further comprise therapeutic medical devices, such as the defibrillator 308. The defibrillator 308 is electrically coupled to an electrode assembly package 322 placed on the chest of the patient 302. The defibrillator 308 may take a generally common form, and may be a professional style defibrillator, such as the X SERIES, R SERIES, M SERIES, or E SERIES provided by ZOLL Medical Corporation of Chelmsford, Mass., or an automated external defibrillator (AED), including the AED PLUS, or AED PRO from ZOLL Medical Corporation.

The electrode package assembly 322 is an assembly that combines an electrode positioned high on the right side of the patient's torso, a separate electrode positioned low on the left side of the patient's torso, and a sensor package located over the patient's sternum. The sensor package, which, in this example, is obscured in the figure by the hands of acute care provider 304 may include an accelerometer or similar motion sensor, or light sensor, which can be configured to transmit data to a computer in the defibrillator 308 to monitor performance of the chest compressions. Information from motion sensors associated with the electrode assembly 322 can be used to supplement and calibrate motion sensor information obtained from sensor devices 110, 112 attached to the acute care provider's hands. In other examples, signals from motion sensors associated with the electrode package assembly 322 can be compared with motion sensor information from the wearable sensor devices 110, 112 to determine, for example, which of the acute care providers at the emergency scene is performing chest compressions. In another example, an acceleration waveform from the sensors associated with the electrode assembly 322 and an acceleration waveform from the wearable sensor device(s) 110, 112 may be compared to determine whether full release (e.g., the acute care provider's 304 hands are lifted from the patient's chest) is occurring during each decompression stroke.

Once electrodes are connected to the patient, the defibrillator 308 can monitor the status of the patient to determine whether a shockable rhythm is present. Alternatively, acute care providers may use other types of patient monitor devices in combination with the defibrillator 308, such as heart rate monitors, ventilation parameter monitors, and other devices, to obtain additional information about patient condition. The patient monitor devices and/or the defibrillator 308 can communicate wirelessly with the wearable sensor device(s) 110, 112 and/or controller device 128 (shown in FIGS. 1A, 1C, and 5) to present information or feedback to the acute care providers 304, 306. For example, the wearable sensor devices 110, 112 can be configured to emit an alert or alarm (e.g., haptic, visual, or audio feedback) informing the acute care providers 304, 306 that a shockable rhythm is present and that they should release the patient's chest. In other examples, the sensor devices 110, 112 can provide feedback instructing the acute care providers 304, 306 to review a visual display of another medical device (e.g., the defibrillator 308 and/or additional patient monitors) to receive additional feedback and/or information about the patient 302. The defibrillator 308 can further comprise wireless communications circuitry for transmitting sensed cardiac information obtained by the defibrillator 308 to the portable computing device 340 and/or rescue management device 310.

Rescue Management Process:

Processes and routines carried out by the rescue management system 300 for identifying acute care providers wearing wearable sensor devices, coordinating actions of multiple acute care providers, and providing feedback to individual acute care providers will now be described. While the following discussion focuses on elements of the rescue management system 300 described herein, such elements are merely exemplary. The processes described herein can be carried out by many different types of electronic and/or computerized devices, including dedicated electronic devices that provide CPR assistance for acute care providers, as well as multifunction electronic devices such as smart phones, PDAs, defibrillator, monitor, tablet PCs, and/or similar devices.

Figure 13:
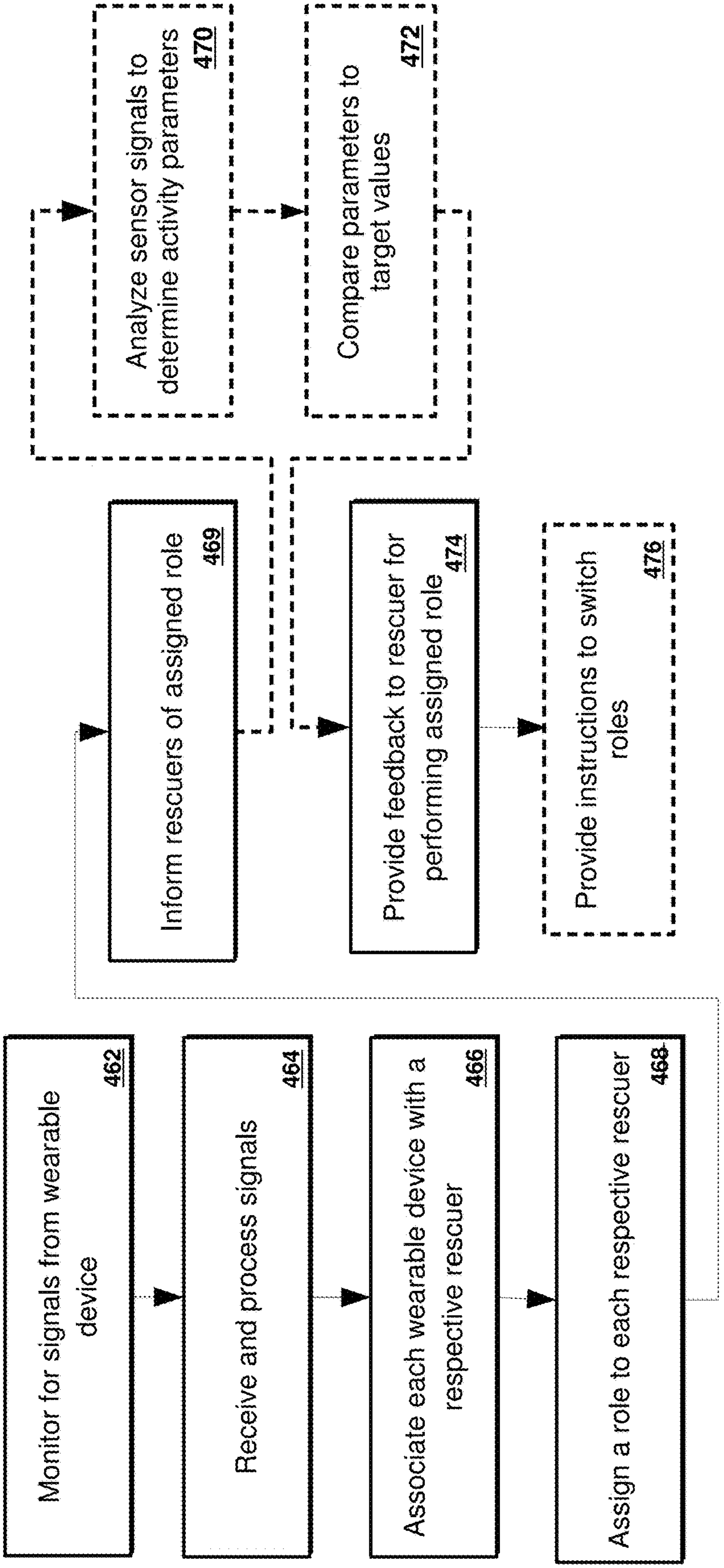
FIG. 13 is a flowchart of an exemplary process for coordinating resuscitation activities performed by acute care providers during treatment of a patient, according to an aspect of the disclosure.

With reference to FIG. 13, a flowchart illustrating an exemplary process performed, for example, by the rescue management device 310 for coordinating acute care provider activity at an emergency scene is illustrated. As shown at box 462, the rescue management device is configured to wirelessly monitor for signals emitted from wearable sensor device(s) worn by acute care providers. For example, upon arrival at an emergency scene, a rescue management device 310 can be configured to scan for signals emitted by wearable sensor device(s) to determine how many acute care providers are present.

As shown at box 464, signals emitted from wearable medical device(s) within range of the rescue management device 310 are received and processed to determine movement information for acute care providers wearing the respective device(s) 110, 112. As shown at box 466, the received and processed information from each wearable sensor device 110, 112 is then associated with a respective acute care provider wearing each device. By associating specific signals with specific acute care providers and/or wearable devices, targeted feedback for performance of resuscitation activities can be provided to each acute care provider.

After the acute care providers are identified and information from each wearable sensor device(s) is associated with a respective acute care provider, as shown at box 468, the rescue management device 310 can assign a role to one or more of the respective acute care providers. For example, a role can include instructions to begin performing a resuscitation activity, such as chest compressions or ventilations.

In some examples, the rescue management device 310 assigns roles automatically either randomly or according to predetermined criteria. For example, the assignment of a role to an acute care provider can be based on characteristics of the acute care provider such as physical strength, experience or skill with particular types of resuscitation activity, as well as on an acute care provider's size, height, or weight. In other examples, the rescue management device 310 can consider elements of the emergency scene when associating a particular role to an acute care provider. For example, the assignment of roles can be based on the location of a particular acute care provider (e.g., an acute care provider that is still in the ambulance can be assigned to take out and set up the defibrillator, an acute care provider sitting near the patient's torso can be instructed to begin chest compressions). Similarly, if space or access to the patient is a concern, such as is the case in a vehicle accident, smaller acute care providers can be assigned to provide treatment to the patient while larger acute care providers are assigned other tasks.

As shown at box 469, each acute care provider can be informed of which role he or she has been assigned by a notification from his or her respective wearable sensor device. The instructions can be provided by one or more output components of the acute care provider's respective wearable sensor device. For example, the rescue management device 310 may cause an acute care provider's wearable sensor device to emit an audible instruction such as "Begin Chest Compressions Now" or "Pick-Up Ventilation Bag." In other examples, the wearable sensor device may be configured to vibrate in a particular pattern and/or intensity, which the acute care provider knows represents a specific resuscitation activity. The role can be assigned for an entire duration of an emergency event. Alternatively, the assigned role can change over the course of the emergency event. For example, an acute care provider may be initially assigned to provide chest compressions for a predetermined duration. Following the predetermined duration, the rescue management device may cause the acute care provider's wearable sensor device to emit an instruction to switch roles and to begin performing another resuscitation activity or to take a break for a predetermined period.

In other examples, the acute care provider can select a role and/or a resuscitation activity to perform based on experience and/or personal preference. In some instances, the acute care provider can perform a gesture recognizable by the wearable sensor device(s) for the role which he/she will perform. For example, if the acute care provider chooses to perform chest compressions, the acute care provider places his/her hands next to one another and move them in a downward direction to mimic a compression action. For performance of a ventilation activity, the acute care provider may mimic squeezing a ventilation bag.

Optionally, as shown at box 470, signals received from sensors on the wearable sensor device worn by the acute care provider can be analyzed to evaluate and/or determine parameters for the resuscitation activity being performed by the acute care provider. As shown at box 472, the determined parameters can be compared to target values for the resuscitation activity(s) being performed. As shown at box 474, as a result of the comparison, feedback can be provided to the acute care provider regarding performance of the assigned role. Feedback can comprise real-time or substantially instantaneous feedback regarding the performance of the resuscitation activities so that the acute care provider can adjust performance of the resuscitation activities to improve conformance to target parameters. In other examples, feedback comprises an overall metric or score representative of a quality of the performed resuscitation activities over the course of the treatment event.

As shown at box 476, optionally, after a period of time, the acute care providers can be instructed to switch roles. For example, the rescue management device 310 can be configured to cause each acute care provider's wearable sensor device 110, 112 to provide a notification informing the acute care provider to switch to another role. In some cases, the acute care provider can be instructed which new role to perform. In other examples, the acute care provider can select the new role by, for example, beginning to perform a different type of resuscitation activity. In that case, signals received from the motion sensors of the acute care provider's wearable sensor device(s) can be used to infer or determine which new role the acute care provider has selected. In some examples, the instruction to switch roles is provided after a predetermined period of time (e.g., about two minutes). In other examples, the determination of when to instruct acute care providers to switch roles can be based on analysis of signals received from motion sensors of the wearable sensor device(s). In particular, the motion sensor signals can be analyzed to identify deterioration of CPR quality, which can indicate acute care provider fatigue. If information recorded by a wearable sensor device indicates that an acute care provider is not providing resuscitation activities of an expected quality (e.g., in the case of a chest compression, it could be determined that the compression rate and/or depth is substantially different than a target value), the acute care provider can be instructed to switch to another role. Similarly, if information collected by a wearable sensor device indicates that the acute care provider is becoming fatigued (e.g., a decreasing trend in CPR quality is identified) the acute care provider management device and/or wearable sensor device(s) can instruct the acute care provider to change roles.

The acute care providers can continue to provide treatment to the patient in accordance with the treatment protocol for as long as necessary or appropriate for the emergency situation. After a period of time, the acute care providers are instructed to cease providing treatment to the patient. The instruction to cease treatment could occur, for example, because the acute care providers and patient have arrived at a hospital or medical facility and others have taken over responsibility for treating the patient.

Although wearable sensor devices and rescue management systems have been described for the purpose of illustration based on what is currently considered to be the most practical examples, it is to be understood that such detail is solely for that purpose and that the invention is not limited to the disclosed examples, but, on the contrary, is intended to cover modifications and equivalent arrangements. For example, it is to be understood that this disclosure contemplates that, to the extent possible, one or more features of any example can be combined with one or more features of any other example.

As used herein, the singular form of "a", "an", and "the" include plural referents unless the context clearly dictates otherwise.

As used herein, the terms "right", "left", "top", and derivatives thereof relate to aspects of the present disclosure as it is oriented in the drawing figures. However, it is to be understood that embodiments of the present disclosure can assume various alternative orientations and, accordingly, such terms are not to be considered as limiting. Also, it is to be understood that embodiments of the present disclosure can assume various alternative variations and stage sequences, except where expressly specified to the contrary. It is also to be understood that the specific devices and processes illustrated in the attached drawings, and described in the following specification, are provided as examples. Hence, specific dimensions and other physical characteristics related to the embodiments disclosed herein are not to be considered as limiting.

What is claimed is:

1. A system for providing feedback for at least one resuscitation activity performed on a patient by an acute care provider, the system comprising:

a first sensor configured to sense movement of a first portion of an acute care provider's hand in a first direction;

a second sensor configured to sense movement of a second portion of the acute care provider's hand in a second direction, which is different than the first direction; and at least one processor in communication with the first sensor and the second sensor configured to:

receive and process signals from the first sensor and the second sensor;

identify a type of the at least one resuscitation activity being performed by the acute care provider from a plurality of types of resuscitation activities based, at least in part, on the received and processed signals from the first sensor and the second sensor;

record a time that the identified type of the at least one resuscitation activity is being performed, determine at least one resuscitation activity parameter for the identified type of the at least one resuscitation activity performed on the patient based, at least in part, on the received and processed signals from the first sensor and the second sensor; and cause a feedback device communicatively coupled to the at least one processor to provide feedback guiding the acute care provider in performance of the identified type of the at least one resuscitation activity based, at least in part, on the determined at least one resuscitation activity parameter.

2. The system of claim 1, wherein one of the plurality of types of resuscitation activities performed on the patient by the acute care provider comprises chest compressions and the at least one resuscitation activity parameter comprises at least one of compression depth or compression rate.

3. The system of claim 2, wherein the plurality of types of resuscitation activities comprises a plurality of types of chest compressions, and wherein the provided feedback guiding the acute care provider in performance of the chest compressions is adapted for the identified type of the chest compressions.

4. The system of claim 3, wherein the feedback provided by the feedback device comprises instructions for performing the identified type of chest compressions in accordance with a predetermined treatment protocol.

5. The system of claim 3, wherein the plurality of types of chest compressions comprises chest compressions performed by pressing against a sternum of the patient or chest compressions performed by squeezing a chest and back of the patient together.

6. The system of claim 3, wherein the plurality of types of chest compressions comprises two finger chest compressions, one hand chest compressions, two hand chest compressions, or chest compressions between a finger and thumb of the acute care provider.

7. The system of claim 1, wherein one of the plurality of types of resuscitation activities performed on the patient by the acute care provider comprises manual ventilations and the at least one resuscitation activity parameter comprises at least one of ventilation volume or ventilation rate.

8. The system of claim 1, wherein one of the plurality of types of resuscitation activities performed on the patient by the acute care provider comprises manually compressing a ventilation bag, and wherein the at least one resuscitation activity parameter comprises at least one of air volume expelled from the bag by the compression or flow rate of air expelled from the bag.

9. The system of claim 1, wherein one of the plurality of types resuscitation activities performed on the patient by the acute care provider comprises administering a therapeutic agent to the patient using a syringe, and wherein the at least one resuscitation activity parameter comprises one or more of injection volume, unused fluid volume in the syringe, or injection flow rate.

10. The system of claim 1, wherein the at least one processor is configured to determine the feedback to be provided by the feedback device based on a comparison between the determined at least one resuscitation activity parameter and a target range of parameter values for the at least one resuscitation activity being performed.

11. The system of claim 10, wherein the feedback comprises an instruction to adjust performance of the at least one resuscitation activity when the determined at least one resuscitation activity parameter is outside of the target range for the at least one resuscitation activity being performed.

12. The system of claim 10, wherein the at least one processor is configured to determine the target range of performance values based, at least in part, on a characteristic of the patient, and wherein the characteristic of the patient comprises at least one of a present condition of the patient, a medical history of the patient, an age of the patient, or a height and/or weight of the patient.

13. The system of claim 1, further comprising the feedback device communicatively coupled to the at least one processor, wherein the feedback device comprises one or more of a haptic output component, a visual indication component, and an audio output component.

14. The system of claim 1, further comprising the feedback device, which comprises a patient monitor comprising circuitry for sensing physiological signals of the patient, wherein the at least one processor is configured to cause the patient monitor to output a summary of care including the physiological signals sensed by the patient monitor correlated with the received and processed signals from the first sensor and the second sensor.

15. The system of claim 1, further comprising the feedback device communicatively coupled to the at least one processor, wherein the feedback device comprises a tablet, smartphone, or portable computer.

16. The system of claim 15, wherein the tablet, smartphone, or portable computer is in direct or indirect wireless communication with the first sensor and the second sensor.

17. The system of claim 1, wherein the first sensor is configured to sense movement of the acute care provider's thumb and the second sensor is configured to sense movement of one of the acute care provider's fingers.

18. The system of claim 1, further comprising a glove configured to be worn by the acute care provider, wherein the first sensor and the second sensor are integrated with and/or attached to the glove.

19. The system of claim 1, wherein the first sensor and/or the second sensor are disposed in ring-shaped housings, the housings being configured to be worn about the acute care provider's thumb or a finger.

20. The system of claim 1, wherein the first sensor and/or the second sensor comprise an adhesive substrate for adhering the sensor to a portion of the acute care provider's hand.

21. The system of claim 1, wherein the plurality of types of resuscitation activities comprises manual ventilations, administration of a therapeutic agent to the patient, chest compressions performed by pressing against a sternum of the patient, chest compressions performed by squeezing a chest and back of the patient together, two finger chest compressions, one hand chest compressions, two hand chest compressions, or chest compressions between a finger and thumb of the acute care provider.

22. The system of claim 1, wherein the at least one processor is further configured to output a summary of care for treatment of the patient including a record of recorded times that identified types of resuscitation activities are performed for the patient by the acute care provider.

23. The system of claim 1, wherein the feedback provided by the feedback device comprises instructions for performing the identified type of the at least one resuscitation activity in accordance with a predetermined treatment protocol.

* * * * *